(12) United States Patent
Isahaya et al.

(10) Patent No.: US 8,969,505 B2
(45) Date of Patent: Mar. 3, 2015

(54) PROCESS FOR MANUFACTURING BRANCHED AROMATIC POLYCARBONATE RESIN WITH DESIRED DEGREE OF BRANCHING

(75) Inventors: Yoshinori Isahaya, Ibaraki (JP); Atsushi Hirashima, Chiba (JP); Hidefumi Harada, Hyogo (JP); Maki Ito, Ibaraki (JP); Jun-ya Hayakawa, Chiba (JP); Takehiko Isobe, Chiba (JP); Taichi Tokutake, Tokyo (JP); Yousuke Shinkai, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/984,380

(22) PCT Filed: Feb. 9, 2012

(86) PCT No.: PCT/JP2012/052988
§ 371 (c)(1),
(2), (4) Date: Aug. 8, 2013

(87) PCT Pub. No.: WO2012/108510
PCT Pub. Date: Aug. 16, 2012

(65) Prior Publication Data
US 2013/0317182 A1 Nov. 28, 2013

(30) Foreign Application Priority Data
Feb. 11, 2011 (JP) ................ 2011-028011

(51) Int. Cl.
C08G 64/00 (2006.01)
C08G 64/42 (2006.01)
C08G 64/30 (2006.01)
C08G 64/16 (2006.01)
C08G 63/02 (2006.01)

(52) U.S. Cl.
CPC ............ *C08G 64/42* (2013.01); *C08G 64/30* (2013.01); *C08G 64/1616* (2013.01)
USPC ........................................ 528/196; 52/198

(58) Field of Classification Search
USPC .............................. 528/196, 198
See application file for complete search history.

(56) References Cited

U.S. PATENT DOCUMENTS

| 4,562,242 A | 12/1985 | Mark et al. |
| 6,399,738 B1 | 6/2002 | Ito et al. |
| 2005/0020804 A1* | 1/2005 | Rohde et al. ............ 528/196 |

FOREIGN PATENT DOCUMENTS

| JP | 52-036159 | 9/1977 |
| JP | 63-023926 | 1/1988 |
| JP | 02-153923 | 6/1990 |
| JP | 05-105751 | 4/1993 |
| JP | 05-202180 | 8/1993 |
| JP | 05-271400 | 10/1993 |
| JP | 05-295101 | 11/1993 |
| JP | 06-099552 | 12/1994 |
| JP | 07-018069 | 1/1995 |
| JP | 07-026009 | 1/1995 |
| JP | 07-05378 | 2/1995 |
| JP | 2674813 | 7/1997 |
| JP | 11-302370 | 11/1999 |
| JP | 3102927 | 8/2000 |
| JP | 2000-281769 | 10/2000 |
| JP | 3249825 | 11/2001 |
| JP | 4598958 | 10/2010 |
| JP | 2011-105931 | 6/2011 |
| WO | 97/32916 | 9/1997 |
| WO | 00/63275 | 10/2000 |
| WO | 2011/062220 | 5/2011 |

OTHER PUBLICATIONS

"Plastic Material; Polycarbonate Resin", Nikkan Kogyo Shimbun Ltd., 1981, pp. 64-66.
"Polymer ", 1978, pp. 521, vol. 27.
"Polycarbonate Handbook", Nikkan Kogyo Shimbun Ltd., 1992, pp. 49.
"International Search Report for PCT/JP2012/052988", mailing date May 1, 2012.

\* cited by examiner

*Primary Examiner* — Terressa Boykin
(74) *Attorney, Agent, or Firm* — Greenblum & Bernstein, P.L.C.

(57) ABSTRACT

A branched aromatic polycarbonate resin having a degree of branching (N value) controlled within a specific range is manufactured by subjecting an aromatic polycarbonate prepolymer that has a branched structure introduced using a specific amount of a branching agent to molecular-weight-increasing linking reaction with an aliphatic diol compound in the presence of a transesterification catalyst under the condition of a reduced pressure. The amount (A) of the branching agent used is adjusted on the basis of the correlation between the amount (A) of the branching agent used and the N value of the branched aromatic polycarbonate resin.

15 Claims, 3 Drawing Sheets

Fig. 1

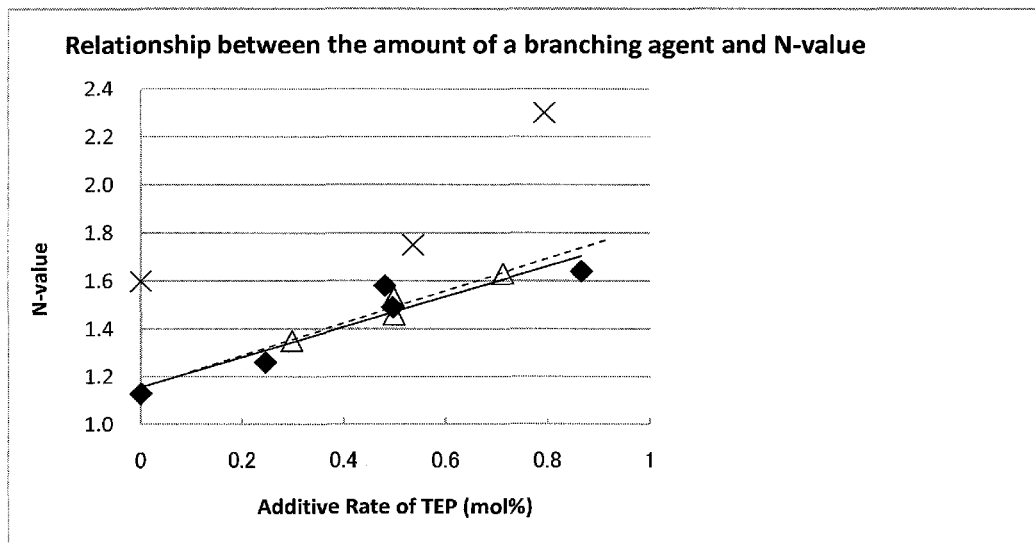

◆: Polycarbonate by linking reaction (Examples 1-4 and Comparative Example 1)
×: Polycarbonate by a conventional melt process (Comparative Examples 2-4)
△: Polycarbonate by an interfacial process (Reference Examples 1-4)
"– – –" line: Polycarbonate by linking reaction (Examples 1-4 and Comparative Exampl
"———" line: Polycarbonate by an interfacial process (Reference Examples 1-4)
y = 0.596X + 1.184 (Polycarbonate by linking reaction)
y = 0.686X + 1.145 (Polycarbonate by an interfacial process)

Fig.2

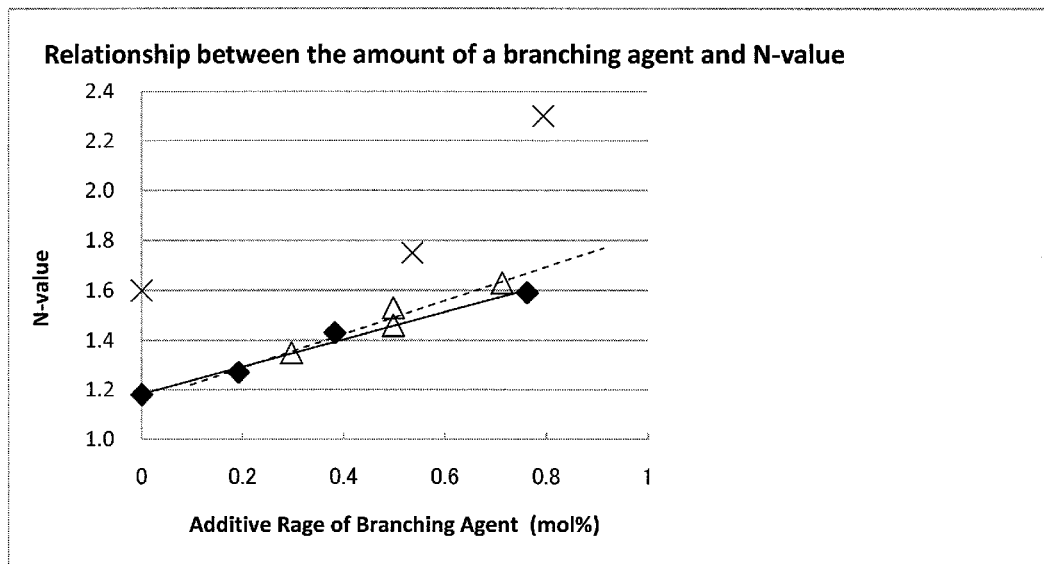

◆: Polycarbonate by linking reaction (Examples 5-7 and Comparative Example 5)
×: Polycarbonate by a conventional melt process (Comparative Examples 2-4)
△: Polycarbonate by an interfacial process (Reference Examples 1-4)

Fig. 3

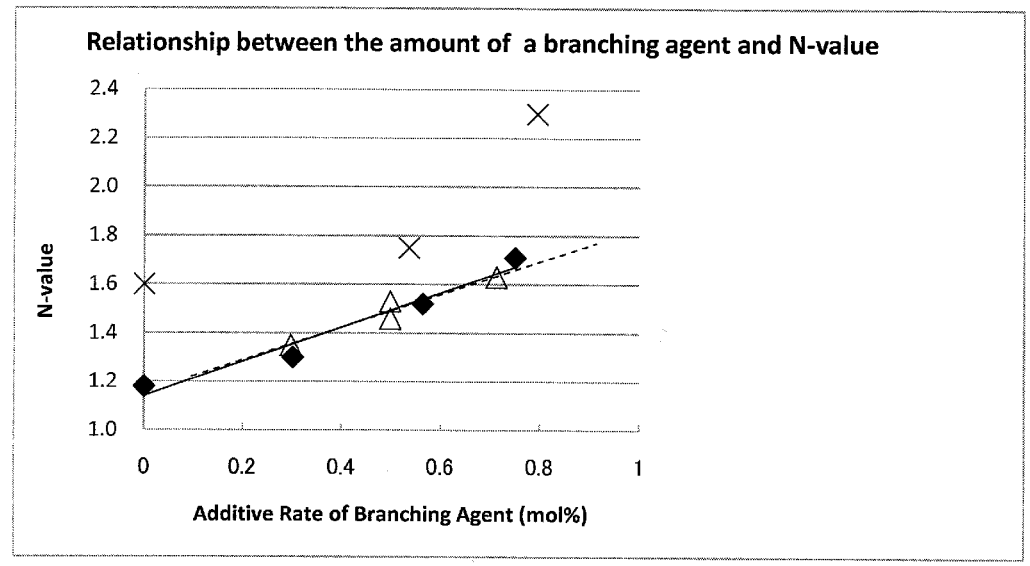

◆: Polycarbonate by linking reaction (Examples 8-10 and Comparative Example 6)
×: Polycarbonate by a conventional melt process (Comparative Examples 2-4)
△: Polycarbonate by an interfacial process (Reference Examples 1-4)

◆: Polycarbonate by linking reaction (Examples 11-13 and Comparative Example 7)
×: Polycarbonate by a conventional melt process (Comparative Examples 2-4)
△: Polycarbonate by an interfacial process (Reference Examples 1-4)

PROCESS FOR MANUFACTURING BRANCHED AROMATIC POLYCARBONATE RESIN WITH DESIRED DEGREE OF BRANCHING

TECHNICAL FIELD

The present invention relates to a process for manufacturing a branched aromatic polycarbonate resin with a desired degree of branching. More precisely, the present invention relates to a process for manufacturing a highly polymerized branched aromatic polycarbonate resin wherein the degree of branching is controlled depending on the used amount of a branching agent by a transesterification reaction.

BACKGROUND ART

Since polycarbonate is excellent in heat resistance, impact resistance and transparency, it has been widely used in many fields in recent years. Various studies have been carried out with processes for production of polycarbonate. Among them, polycarbonate derived from aromatic dihydroxy compounds such as 2,2-bis(4-hydroxyphenyl)propane, hereinafter "bisphenol A", is industrialized by both processes of interfacial polymerization and melt polymerization.

According to the interfacial polymerization, polycarbonate is produced from bisphenol A, an aromatic monohydroxy compound such as p-tert-butyl phenol and phosgene.

Since it can be produced under the condition of relatively low temperature, polycarbonate thus obtained is usually a straight-chain polymer which exhibits a Newtonian property when it is melted. That is, with regard to shearing flowability, its shearing rate dependency of melt viscosity is small, and with regard to elongation flowability, it exhibits an extremely low viscosity. Therefore, when conducting large-scale extrusion molding or blow molding, sags and runs of resin under its own weight would easily occur, and this makes it difficult to carry out molding of large-scale products.

The melting property of a polycarbonate resin can be represented by the formula "$Q = K \cdot P^N$", wherein "Q" represents an outflow rate of a molten resin (ml/sec), "K" represents a segment of the regression formula which is an independent variable derived from a molecular weight and/or structure of the polycarbonate resin, "P" represents a pressure value measured by a constant-load orifice-type flow tester at 280° C. (load: 10-160 kgf) (kg/cm$^2$), and "N"-value represents a structural viscosity index.

When "N"=1 in the above formula, the resin exhibits a Newtonian fluid behavior. As N-value increases, the pressure dependency of flowability would increase and it would tend to exhibit a non-Newtonian fluid behavior.

The melt flow properties of polycarbonate resins used for large-volume hollow-molded products, large-scale extrusion-molded products and the like are evaluated by the above-mentioned N-value. In general, the resins exhibiting a non-Newtonian fluid behavior having a high pressure dependency of flowability is rather preferable, because sags and runs of resin or a drawdown at the time of extrusion and/or molding can be avoided.

Therefore, it is desired to produce arbitrarily a polycarbonate resin having such a preferred melt-flow property that the N-value thereof falls within the adequate range.

Therefore, according to the interfacial polymerization, in general, the non-Newtonian property when melted is controlled by methods such as adding a polycarbonate resin component having an extremely high molecular weight and taking a branching agent into a molecule voluntarily to form a branched structure. That is, blow moldability, drip preventing properties, flame retardance or the like are improved by increasing melt viscosity and/or elongation viscosity in a low shear rate region voluntarily.

These improvements are allowed because, according to the interfacial polymerization, there is a correlative relationship between the amount of a branching agent used and a degree of branching and the desired degree of branching can be adjusted arbitrarily by controlling the amount of the branching agent used.

According to the interfacial polymerization, however, toxic phosgene has to be used in the manufacturing method.

In addition, it remains a problem such as corrosion of equipment caused by by-products such as hydrogen chloride and sodium chloride and chlorine-containing compounds such as methylene chloride used in great quantities as a solvent, and difficulties in removal of impurities such as sodium chloride or residual methylene chloride which might have an influence on polymer properties.

Meanwhile, a melt-polymerization method which has been long known as another method for producing a polycarbonate resin is a method for producing polycarbonate from an aromatic dihydroxy compound and diarylcarbonate, wherein, for example, bisphenol A (BPA) and diphenylcarbonate (DPC) are polymerized through a transesterification reaction under melting conditions while removing by-product aromatic monohydroxy compounds away.

Unlike the interfacial polymerization method, the melt-polymerization method has advantages such as not using solvents. However, since the aromatic monohydroxy compound and diester carbonate in the high-viscosity molten polycarbonate should be removed during the manufacturing process, it is necessary to carry out a prolonged reaction under the conditions of high temperature and high vacuum. As a result, particular kind of equipment durable to a long term reaction at a high temperature under high vacuum and strong stirring devices to deal with a product having high viscosity are required as manufacturing equipment.

Regarding a high-molecular-weight polycarbonate produced by a conventional transesterification method, as shown in Non-Patent Documents 1 to 3, the degree of branching of the polycarbonate is unpredictable when molten since an unspecified amount of branched structures is generated during the manufacturing process. In addition, the polymer exhibits a large non-Newtonian property compared with a polymer produced by interfacial polymerization. As shown in Patent Documents 4-5, the branched structure thereof is caused by branching and/or cross-linking by ester bonding produced by subjecting polycarbonate to a reaction similar to the Kolbe-Schmitt reaction under the action of alkali, and it is known that controlling the amount of branched structures is difficult. That is, the amount of branched structure can be increased and decreased depending on the equipment used and operating conditions. It is extremely difficult to adjust the fluid behavior of polycarbonate when molten in accordance with various molding methods.

Moreover, a high-molecular-weight polycarbonate produced by a conventional transesterification method tends to be deteriorated in color tone and industrially only a yellowish polymer is obtained. Furthermore, it is known that the polymer obtained has a defect of low strength and is easy to cause brittle fracture.

Examples of conventional methods for solving the problem of color tone deterioration include an approach of shortening of time for the reaction by increasing the polymerization rate. More precisely, the molar ratio of DPCs/BPAs at the time of feeding for the polymerization reaction is adjusted to obtain the maximum polymerization rate stoichiometrically. The feeding ratio, which may also be influenced by the characteristics of polymerization reaction equipment, can be set at the range from 1.03 to 1.10, whereby relatively high polymerization rate can be obtained.

According to this method, though it may be effective in the low-molecular-weight range, since the polymerization reaction product becomes a fluid having an extremely high viscosity and the polymerization rate becomes extremely low in the high-molecular-weight range, deterioration of resin such as crosslinking and/or branching and deterioration in color tone caused by prolonged heat retention during polymerization or the like would be observed remarkably. Therefore, it was extremely difficult to obtain a high-molecular-weight polycarbonate wherein the desired amount of branched structures is adjusted arbitrarily by controlling the molar ratio of raw materials fed for polymerization. That is, in the case of producing a polycarbonate resin using a melt polymerization method, it was extremely difficult to quantitatively improve blow moldability, drip preventing properties, flame retardance or the like only by controlling melt viscosity and/or elongation viscosity in a low shear rate region and by controlling the added amount of a branching agent by in the same manner as in interfacial polymerization.

As a method for structural improvement of polycarbonate, there is an approach to decrease branched structures which occur naturally by a transesterification method for producing polycarbonate. For example, Patent Documents 1 and 2 propose a polycarbonate resin produced by a transesterification method which has no branching structure or has branching structures as little as possible. Patent Document 3 proposes a method for producing polycarbonate having 300 ppm or less of a Kolbe-Schmitt type branched structure.

Patent Documents 4 and 5 propose methods to improve color tone by preventing generation of branching structures caused by a side reaction which is extremely difficult in controlling by using a specific catalyst, and to introduce a specific branching structure positively by using a multi-functional compound. They disclose polycarbonate produced by a transesterification method wherein hollow-moldability is improved by increasing a non-Newtonian property of flow behavior.

However, these methods would not be common because they need using a particular kind of compound as a catalyst or a combination or selection of specific catalysts. Furthermore, when using polycarbonate thus obtained, harmful effects of catalysts on a human body and the environment are concerned.

Patent Document 6 discloses an attempt to improve mold flowability using 5-(dimethyl-p-hydroxybenzyl)salicylic acid as a branching agent. However, using this multi-functional compound has a problem which would easily cause generation of gel by a cross-linking action. Patent Documents 7 and 8 propose to adjust the amount of a Kolbe-Schmitt type branching structure derived from heat deterioration within a certain range by employing a particular kind of equipment, specific temperature range and retention conditions. However, according to this method, it is difficult to inhibit natural generation of branched structures fundamentally. Moreover, since the branched structure is a different kind structure generated naturally by heat deterioration reaction, it is necessary to use a particular kind of equipment under specific conditions of operation, in order to control the amount of branching structure as desired.

Patent Document 9 discloses a method of using acid anhydride as a branching agent. However, acid generation in the manufacturing process and the influences of introduction of ester bonding on properties and color tone cannot be ignored. Patent Document 10 discloses polycarbonate obtained by using a branching agent which has 1.36 or higher of a structural viscosity index. However, the relationship between the amount of a branching agent and a degree of branching cannot be found.

Accordingly, it is desired to develop an improved process for producing polycarbonate easily through a common transesterification method which enables to obtain polycarbonate having excellent color tone and physical properties wherein fluid behavior, non-Newtonian properties and molding flowability are well controlled as well as in polycarbonate obtained by interfacial polymerization, or to develop an improved process for producing polycarbonate through a transesterification method which enables to easily obtain polycarbonate having a desired degree of branching by controlling the degree of branching arbitrarily.

As an improvement of a process, Patent Document 11 discloses a manufacturing method using a particular kind of a horizontal stirring polymerization reactor as a final polymerization reactor. Patent Documents 12 and 12 disclose a method using a biaxial vent-type extruder. However, these methods are intended to promote elimination of phenol. Though high-molecular-weight polycarbonate may be obtained by this method, polycarbonate satisfying both physical properties and molding flowability cannot be obtained.

According to conventional method for producing high-molecular-weight aromatic polycarbonate, as mentioned above, various problems are remained to be solved in order to stably control branching structures as desired.

The present inventors had proposed a novel method for producing a high-molecular-weight aromatic polycarbonate resin which enables the increase in molecular weight of the aromatic polycarbonate resin satisfactorily while keeping good quality (Patent Document 14). According to the method, an aromatic polycarbonate prepolymer and a specific aliphatic diol compound as a linking agent are subjected to a transesterification reaction or a copolymerization reaction under reduced pressure in the presence of a transesterification catalyst to be linked with each other and to be highly polymerized. Thereby, a sufficiently highly polymerized polycarbonate resin having excellent properties that a polycarbonate originally has can be obtained.

The practical reaction scheme of the linking and highly-polymerizing reaction by the aliphatic diol compound is exemplified as follows:

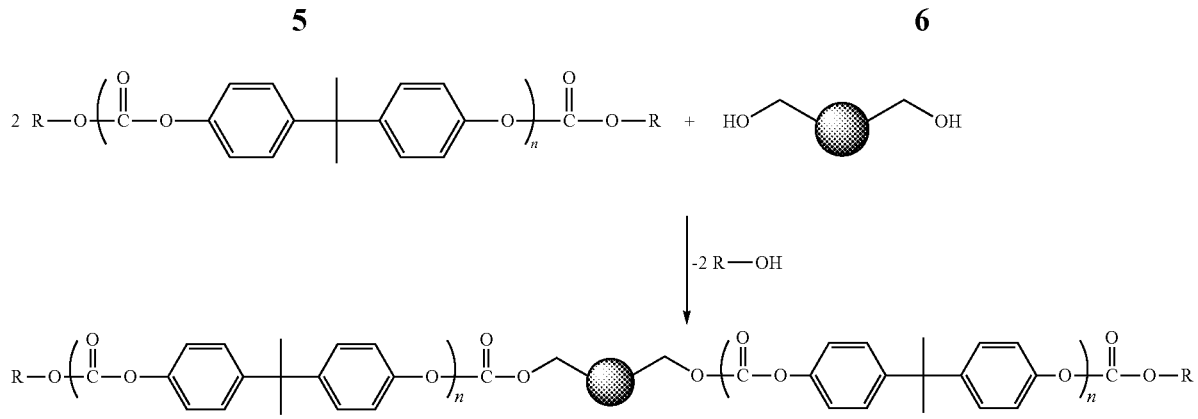

According to the method, a highly polymerized aromatic polycarbonate resin having weight average molecular weight (Mw) of 30,000 to 100,000 can be produced in a short time by chain extension by linking the capped end of an aromatic polycarbonate with an aliphatic diol compound. According to the method, since polycarbonate is produced by a high-rate polymerization reaction, branching and/or cross-linking reactions caused by a prolonged heat retention can be inhibited, and thus, deterioration of polymer such as color change can be avoided.

Patent Documents 15 and 16 disclose a method for producing polycarbonate by adding divalent diols at latter stage of the transesterification reaction. However, they do not teach whether the degree of branching can be adjusted by controlling the additive amount of branching agents. Moreover, the polycarbonate thus obtained is not successfully satisfied in quality.

Thus, it is expected to develop a method for easily producing polycarbonate having a desired degree of branching by applying the above-mentioned technology of highly polymerizing which enables to obtain a sufficiently highly polymerized polycarbonate resin while keeping excellent properties that a polycarbonate originally has.

PRIOR ART DOCUMENTS

Patent Document

Pat. Doc. 1: Jpn. Pat. No. 3102927
Pat. Doc. 2: Jpn. Unexamined Pat. Appl. Publ. No. H05-202180
Pat. Doc. 3: Jpn. Unexamined Pat. Appl. Publ. No. H07-018069
Pat. Doc. 4: Jpn. Unexamined Pat. Appl. Publ. No. H05-271400
Pat. Doc. 5: Jpn. Unexamined Pat. Appl. Publ. No. H05-295101
Pat. Doc. 6: U.S. Pat. No. 4,562,242
Pat. Doc. 7: Jpn. Pat. No. 3249825
Pat. Doc. 8: Jpn. Pat. No. 3249825
Pat. Doc. 9: Jpn. Pat. No. 4598958
Pat. Doc. 10: Jpn. Unexamined Pat. Appl. Publ. No. H11-302370
Pat. Doc. 11: Jpn. Pat. No. 2674813
Pat. Doc. 12: Jpn. Examined Pat. Appl. Publ. No. S52-036159
Pat. Doc. 13: Jpn. Examined Pat. Appl. Publ. No. H06-099552
Pat. Doc. 14: WO2011/062220
Pat. Doc. 15: Jpn. Unexamined Pat. Appl. Publ. No. H07-026009
Pat. Doc. 16: Jpn. Unexamined Pat. Appl. Publ. No. H07-053708

Non-Patent Document

Non-Pat. Doc. 1: "Plastic Material; Polycarbonate Resin" published by Nikkan Kogyo Shimbun Ltd., 1981, p. 64-66
Non-Pat. Doc. 2: "POLYMER" vol. 27, July 1978, p. 521
Non-Pat. Doc. 3: "Polycarbonate Handbook", published by Nikkan Kogyo Shimbun Ltd., 1992, p. 49

DISCLOSURE OF THE INVENTION

Problems to be Solved by the Invention

The problem to be solved by the present invention is to provide a process for manufacturing, easily and using a conventional branching agent, a branched aromatic polycarbonate resin which has both a sufficient high molecular weight and a desired degree of branching.

Means for Solving the Problems

As a result of the intensive studies to solve the above problems, the present inventors have found that, when subjecting an aromatic polycarbonate prepolymer that has a branched structure introduced using a specific amount of a branching agent to linking reaction with an aliphatic diol compound in the presence of a transesterification catalyst, there is a certain level of correlation between the amount of the branching agent used and the degree of branching of the high-molecular-weight branched aromatic polycarbonate thus obtained, and thus completed the present invention.

That is, the present invention is related to a process for manufacturing a branched aromatic polycarbonate resin as follows:

(1) A process for manufacturing a branched aromatic polycarbonate resin having a desired degree of branching which comprises a process wherein an aromatic polycarbonate prepolymer having a branched structure introduced by using a predetermined amount of a branching agent is subjected to linking and highly-polymerizing reaction under reduced pressure with an aliphatic diol compound having aliphatic hydrocarbon groups bonding to terminal OH groups.

(2) The process for manufacturing a branched aromatic polycarbonate resin according to (1), wherein the degree of branching of said branched aromatic polycarbonate resin is controlled within a desired range by adjusting the amount of said branching agent used (A; mol %) on the basis of a correlation between the amount of said branching agent used (A) and said degree of branching which is a structural viscosity index, "N-value", represented by the following mathematical formula (I):
[Mathematical Formula 1]

$$N\text{-value} = (\log(Q160) - \log(Q10))/(\log 160 - \log 10) \quad (I)$$

wherein "Q160" represents a melting fluid volume per unit time (ml/sec) measured under the conditions of 280° C. and 160 kg load and "Q10" represents a melting fluid volume per unit time (ml/sec) measured under the conditions of 280° C. and 10kg load.

(3) The process for manufacturing a branched aromatic polycarbonate resin according to (2), wherein said correlation between the amount of the branching agent used (A) and the degree of branching (N-value) satisfies the following mathematical formula (II):
[Mathematical Formula 1]

$$N\text{-value} = K_1 A + K_2 \quad (II)$$

wherein $K_1$ represents a constant number from 0.1 to 2.0 and $K_2$ represents a constant number from 1.05 to 1.5.

(4) The process for manufacturing a branched aromatic polycarbonate resin according to any one of (1) to (3), wherein said amount of the branching agent used (A) is 0.01 to 1 mol % based upon the total amount (total mole number) of carbonate constituting units of said aromatic polycarbonate prepolymer.

(5) The process for manufacturing a branched aromatic polycarbonate resin according to any one of (1) to (4), wherein said degree of branching ("N-value") is 1.1 to 2.2.

(6) The process for manufacturing a branched aromatic polycarbonate resin according to any one of (1) to (5), wherein said aliphatic diol compound is represented by the following general formula (I):

$$HO-(CR_1R_2)_n-Q-(CR_3R_4)_m-OH \quad (I)$$

wherein "Q" represents a hydrocarbon group having at least 3 carbon atoms which may contain atoms of a different kind; $R_1$-$R_4$ each independently represent a group selected from the group consisting of a hydrogen atom, an aliphatic hydrocarbon group having 1-30 carbon atoms and an aromatic hydrocarbon group having 1-30 carbon atoms, with the proviso that at least one of $R_1$ and $R_2$ and at least one of $R_3$ and $R_4$ are each independently selected from the group consisting of a hydrogen atom and said aliphatic hydrocarbon group; "n" and "m" each independently represent an integer of 0-10, or "n" and "m" each independently represent an integer of 1-10 in the case that "Q" does not contain aliphatic hydrocarbon groups bonding to terminal OH groups.

(7) The process for manufacturing a branched aromatic polycarbonate resin according to any one of (1) to (6), wherein said aliphatic diol compound has a boiling point of 240° C. or higher.

(8) The process for manufacturing a branched aromatic polycarbonate resin according to any one of (1) to (7), wherein the concentration of terminal hydroxy groups of said aromatic polycarbonate prepolymer is 1,500 ppm or less.

(9) The process for manufacturing a branched aromatic polycarbonate resin according to any one of (1) to (8), wherein the weight average molecular weight (Mw) of said branched aromatic polycarbonate resin is higher by 5,000 or more than the weight average molecular weight (Mw) of said aromatic polycarbonate prepolymer.

(10) The process for manufacturing a branched aromatic polycarbonate resin according to any one of (1) to (9), wherein said aliphatic diol compound is used in an amount of 0.01 to 1.0 mole per mole of the total amount of the terminal groups of said aromatic polycarbonate prepolymer.

(11) The process for manufacturing a branched aromatic polycarbonate resin according to any one of (1) to (10), wherein said linking and highly-polymerizing reaction is carried out at a temperature of 240° C.-320° C. under reduced pressure.

(12) The process for manufacturing a branched aromatic polycarbonate resin according to any one of (1) to (11), wherein said linking and highly-polymerizing reaction is carried out under reduced pressure of 13 kPa (100 torr) to 0.01 kPa (0.1 torr).

(13) The process for manufacturing a branched aromatic polycarbonate resin according to any one of (1) to (12), wherein the weight average molecular weight (Mw) of said aromatic polycarbonate prepolymer is 5,000 to 60,000.

(14) A branched aromatic polycarbonate resin which is manufactured by the process according to any one of (1) to (13).

(15) The branched aromatic polycarbonate resin according to (14), wherein the weight average molecular weight (Mw) thereof is 30,000 to 100,000.

Effect of the Invention

The present invention enables to obtain a high-molecular-weight branched aromatic polycarbonate resin having a desired degree of branching under mild conditions in a short time by a simple process wherein an aromatic polycarbonate prepolymer having a branched structure introduced by using a predetermined amount of a branching agent is subjected to linking and highly-polymerizing reaction under reduced pressure with an aliphatic diol compound having aliphatic hydrocarbon groups bonding to terminal OH groups.

It is based on the find that there is a certain level of correlation between the amount of the branching agent used and the degree of branching of the high-molecular-weight branched aromatic polycarbonate thus obtained, whereby the amount of branching structures of aromatic polycarbonate can be adjusted as desired by melt polymerization.

In addition, according to the present invention, since the time for producing polycarbonate can be shortened and the process can be carried out under mild conditions or the reaction can be carried out at lower temperature with higher reaction rate, the conditions of high temperature and high shear can be avoided compared to the conventional methods. As a result, since coloring, cross-linking and/or gelation are not generated in the resin, a branched aromatic polycarbonate resin excellent in color tone and quality which does not contain unexpected branched structures can be obtained.

BRIEF DESCRIPTION OF THE DRAWINGS

[FIG. 1]
FIG. 1 shows a graph showing the relationship between the amount of the branching agent used and N-value of the polycarbonates obtained by Examples 1-4, Comparative Examples 1-4 and Reference Examples 1-4.
[FIG. 2]
FIG. 2 shows a graph showing the relationship between the amount of the branching agent used and N-value of the polycarbonates obtained by Examples 5-7 and Comparative Example 5.
[FIG. 3]
FIG. 3 shows a graph showing the relationship between the amount of the branching agent used and N-value of the polycarbonates obtained by Examples 8-10 and Comparative Example 6.

FIG. 4 shows a graph showing the relationship between the amount of the branching agent used and N-value of the polycarbonates obtained by Examples 11-13 and Comparative Example 7.

MODES FOR CARRYING OUT THE INVENTION

Figure 4:
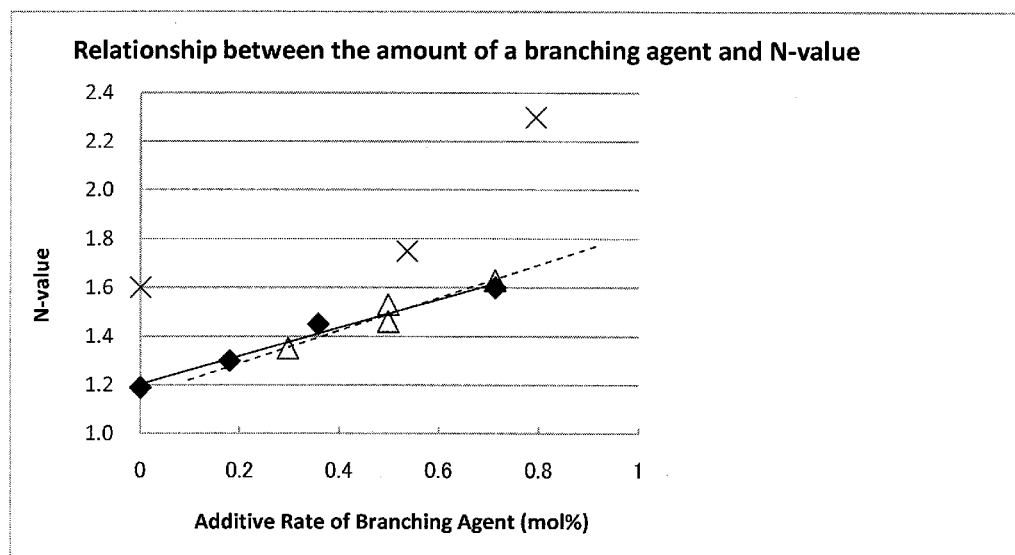
[FIG. 4]

The process of the present invention comprises a step of carrying out highly-polymerizing reaction between an aromatic polycarbonate prepolymer having a branched structure introduced by using a predetermined amount of a branching agent and an aliphatic diol compound in the presence of a transesterification catalyst under reduced pressure.

(1) Aromatic Polycarbonate Prepolymer

The aromatic polycarbonate prepolymer according to the present invention is a polycondensation polymer which is formed, as a main repeating unit, of a constituent unit represented by the following general formula (1) which is a carbonate constituting unit and has a branched structure in a molecular chain introduced by using a branching agent as described below.

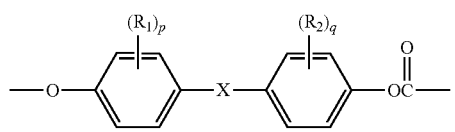

(1)

In the general formula (1), $R_1$ and $R_2$ each independently represent a hydrogen atom, a halogen atom, an alkyl group having 1-20 carbon atoms, an alkoxy group having 1-20 carbon atoms, a cycloalkyl group having 6-20 carbon atoms, an aryl group having 6-20 carbon atoms, a cycloalkoxyl group having 6-20 carbon atoms or an aryloxy group having 6-20 carbon atoms.

"p" and "q" each independently represent an integer of 0-4. "X" represents a group selected from the group consisting of the divalent organic groups represented by the following general formulas (1'):

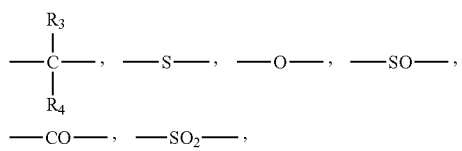

(1')

In the general formula (1'), $R_3$ and $R_4$ each independently represent a hydrogen atom, an alkyl group having 1-10 carbon atoms or an aryl group having 6-10 carbon atoms $R_3$ and $R_4$ can be linked with each other to form an aliphatic ring.

The above-mentioned aromatic polycarbonate prepolymer can be synthesized by interfacial polymerization or by melt polymerization. It can also be synthesized by solid-phase polymerization or thin-film polymerization. It can also be a recycled polycarbonate recovered from used products such as used disk molded products or recycled products from personal computers.

These polycarbonates can be mixed with each other to use as the above-mentioned aromatic polycarbonate prepolymer. For example, a polycarbonate resin obtained by interfacial polymerization can be mixed with a polycarbonate resin obtained by meld polymerization. Or, a polycarbonate resin obtained by melt polymerization or interfacial polymerization can be mixed with a recycled polycarbonate.

The aromatic polycarbonate prepolymer as mentioned above can also be represented as a polycondensation polymer wherein the main repeating unit is a reaction product of an aromatic dihydroxy compound with a carbonate bond-forming compound.

That is, the aromatic polycarbonate prepolymer of the present invention can be obtained by a known transesterification method wherein an aromatic dihydroxy compound deriving the corresponding structure is reacted with diester carbonate in the presence of a basic catalyst, or a known interfacial polycondensation wherein an aromatic dihydroxy compound deriving the corresponding structure is reacted with phosgene or the like in the presence of an acid binding agent.

(2) Aromatic Dihydroxy Compound

Examples of the aromatic dihydroxy compounds include a compound represented by the following general formula (2):

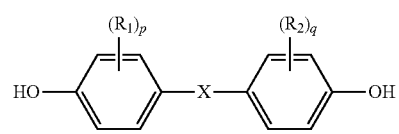

(2)

In the general formula (2), $R_1$ and $R_2$ each independently represent a hydrogen atom, a halogen atom, an alkyl group having 1-20 carbon atoms, an alkoxy group having 1-20 carbon atoms, a cycloalkyl group having 6-20 carbon atoms, an aryl group having 6-20 carbon atoms, a cycloalkoxyl group having 6-20 carbon atoms or an aryloxy group having 6-20 carbon atoms.

"p" and "q" each independently represent an integer of 0-4. "X" represents a group selected from the group consisting of the divalent organic groups represented by the following general formulas (2'):

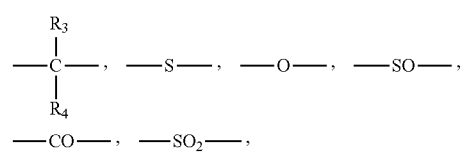

(2')

In the general formula (2'), $R_3$ and $R_4$ each independently represent a hydrogen atom, an alkyl group having 1-10 carbon atoms or an aryl group having 6-10 carbon atoms $R_3$ and $R_4$ can be linked with each other to form an aliphatic ring.

Examples of the above-mentioned aromatic dihydroxy compounds include bis(4-hydroxyphenyl)methane,
1,1-bis(4-hydroxyphenyl)ethane,
2,2-bis(4-hydroxyphenyl)propane,
2,2-bis(4-hydroxyphenyl)butane,
2,2-bis(4-hydroxyphenyl)octane,
bis(4-hydroxyphenyl)phenylmethane,
1,1-bis(4-hydroxyphenyl)-1-phenylethane,
bis(4-hydroxyphenyl)diphenylmethane,
2,2-bis(4-hydroxy-3-metnylphenyl)propane,
1,1-bis(4-hydroxy-3-tert-butylphenyl)propane,
2,2-bis(3,5-dimethyl-4-hydroxyphenyl)propane,
2,2-bis(4-hydroxy-3-phenylphenyl)propane, 2,2-bis(3-cyclohexyl-4-hydroxyphenyl)propane,
2,2-bis(4-hydroxy-3-bromophenyl)propane,
2,2-bis(3,5-dibromo-4-hydroxyphenyl)propane,
1,1-bis(4-hydroxyphenyl)cyclopentane,
1,1-bis(4-hydroxyphenyl)cyclohexane,
2,2-bis(4-hydroxy-3-methoxyphenyl)propane,
4,4'-dihydroxydiphenylether,
4,4'-dihydroxy-3,3'-dimethylphenylether,
4,4'-dihydroxyphenylsulfide,
4,4'-dihydroxy-3,3'-dimethyldiphenylsulfide,
4,4'-dihydroxydiphenylsulfoxide,
4,4'-dihydroxy-3,3'-dimethyldiphenylsulfoxide,
4,4'-dihydroxydiphenylsulfone, and
4,4'-dihydroxy-3,3'-dimethyldiphenylsulfone.

Among them, 2,2-bis(4-hydroxyphenyl)propane is preferable because of the stability as a monomer and availability of a commercial product having a low impurity content.

The aromatic polycarbonate prepolymer of the present invention can also be used by combining two or more of the above-mentioned various monomers (aromatic dihydroxy compounds) if necessary, for the purpose of controlling optical properties such as controlling a glass transition temperature, improving fluidity, improving the refractive index and reducing the birefringence.

(3) Branching Agent

The aromatic polycarbonate prepolymer has a desired amount of branched structure in its molecular chain introduced by using a branching agent at the time of carrying out the reaction of an aromatic dihydroxy compound with a carbonate bond-forming compound.

Examples of the branching agents include a multifunctional compound having at least 3 functional groups in a molecule, preferably 3-6 functional groups in a molecule. Preferable examples of these multifunctional compounds include a compound having a phenolic hydroxy group and/or a carboxyl group.

Examples of compounds having 3 functional groups include 1,1,1-tris(4-hydroxyphenyl)ethane which is same as 1,1,1-trisphenolethane (hereinafter, "TPA"), α,α,α'-tris(4-hydroxyphenyl)-1-ethyl-4-isopropylbenzene, α-methyl-α,α',α"-tris(4-hydroxyphenyl)-1,4-diethylbenzene, α,α',α"-tris(4-hydroxyphenyl)-1,3,5-triisopropylbenzene, phloroglucin, 4,6-dimetnyl-2,4,6-tris(4-hydroxyphenyl)heptane, 1,3,5-tris(4-hydroxyphenyl)benzene, 2,2-bis[4,4-(4,4'-dihydroxyphenyl)-cyclohexyl]propane, trimellitic acid, 1,3,5-benzenetricarboxylic acid, pyromellitic acid, trimethylolpropane (hereinafter, "TMP"), 1,2,5-pentatriol, 3,4-dihydroxybenzylalcohol, 1,2,6-hexatriol, and 1,3,5-adamantanetriol.

Examples of compounds having 4 or more functional groups include purpurogallin, 2,3,4,4'-tetrahydroxybenzophenone, 2,3,4,4'-tetrahydroxydiphenylmethane, gallein, and 2,3,3',4,4',5'-hexahydroxybenzophenone.

Among them, a branching agent selected from the groups consisting of 1,1,1-tris(4-hydroxyphenyl)ethane represented by the following chemical formula (1), α,α,α'-tris(4-hydroxyphenyl)-1-ethyl-4-isopropylbenzene represented by the following chemical formula (2) and trimethylolpropane represented by the following chemical formula (3) is preferable because of stability as a monomer and availability of a commercial product having a low impurity content. The most preferable branching agent is 1,1,1-tris (4-hydroxyphenyl) ethane.

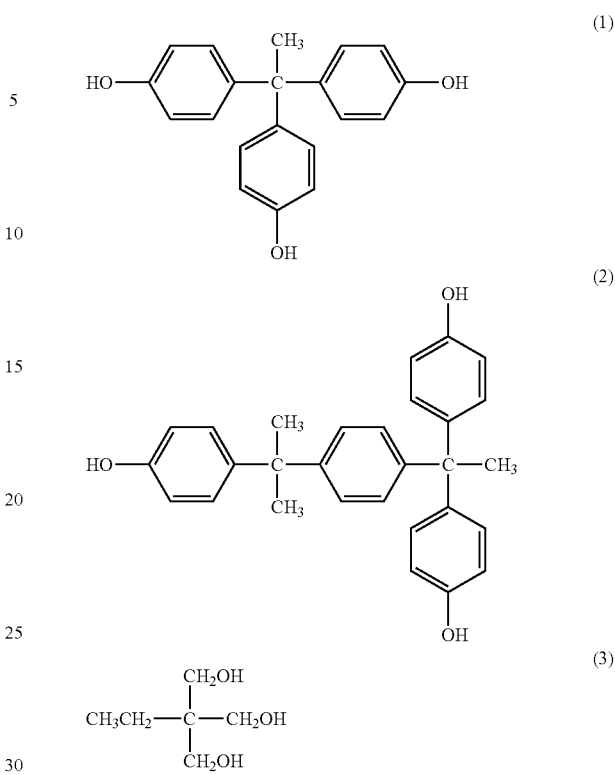

The amount of the branching agent to be used or the amount of the branched structure to be introduced can be varied depending on the purpose for improvement of properties such as blow moldability, drip preventing properties and flame retardant properties. It is desirable that the amount of the branching agent is preferably 0.01-1 mol %, more preferably 0.1-0.9 mol %, most preferably 0.2-0.8 mol % based upon the total amount (total mole number) of the carbonate structural unit represented by the above-mentioned general formula (1) in the aromatic polycarbonate prepolymer. Or it is desirable that the amount of the branching agent is preferably 0.01-1 mol %, more preferably 0.1-0.9 mol %, most preferably 0.2-0.8 mol % based upon the total amount (total mole number) of all the aromatic dihydroxy compounds to be used and all the branching agents to be used.

(4) Process for Producing Aromatic Polycarbonate Prepolymer

The aromatic polycarbonate prepolymer of the present invention can be produced by carrying out the reaction between an aromatic dihydroxy compound and a carbonate bond-forming compound together with a branching agent.

In the case of interfacial polymerization, examples of carbonate bond-forming compounds include carbonyl halides such as phosgene and haloformates.

In the case of using phosgene as a carbonate bond-forming compound, for example, the reaction is usually carried out in the presence of acid binding agents and solvents. Examples of the acid binding agents include alkali metal hydroxide such as sodium hydroxide and potassium hydroxide and amines such as pyridine. Examples of the solvents include halogenated hydrocarbon such as methylene chloride and chlorobenzene. In addition, a catalyst such as tertiary amines or quaternary ammonium salts can be used for accelerating the reaction. The reaction temperature is usually in the range from 0° C. to 40° C. and the reaction time is usually in the range from several minutes to 5 hours.

In the case of melt polymerization, diester carbonate is used as a carbonate bond-forming compound. Examples of diester carbonate include aromatic diester carbonates such as diphenyl carbonate, ditolyl carbonate, bis(2-chlorophenyl) carbonate, m-cresyl carbonate, dinaphthyl carbonate and bis (4-phenylphenyl)carbonate. Other diester carbonates such as dimethyl carbonate, diethyl carbonate, dibutyl carbonate and dicyclohexyl carbonate can be used if necessary. Among them, it is preferable to use diphenyl carbonate from a viewpoint of reactivity, stability against coloring of the resin thus obtained and cost.

The diester carbonate is used preferably in an amount of 0.95 to 1.30 mole, more preferably 0.98 to 1.20 mole per mole of the total amount of aromatic dihydroxy compounds.

The melt polymerization using diester carbonate as a carbonate bond-forming compound is carried out by stirring the aromatic dihydroxy compound with diester carbonate at a predetermined rate on heating under an inert gas atmosphere and then distilling the produced alcohols or phenols away.

While the reaction temperature is depending on the boiling point of alcohols or phenols thus produced, it is usually in the range from 120° C. to 350° C. The reaction is carried out under reduced pressure from the beginning and is completed by continuously distilling the produced alcohols or phenols. Transesterification catalysts such as basic compound catalysts which are commonly used can be used in order to accelerate the reaction.

Furthermore, when producing the aromatic polycarbonate prepolymer of the present invention, it is possible to use a dicarboxylic acid compound in combination with the above-mentioned aromatic dihydroxy compound to produce polyestercarbonate.

Examples of the dicarboxylic acid compounds include terephthalic acid, isophthalic acid, naphthalene dicarboxylic acid and 1,4-cyclohexane dicarboxylic acid. It is preferable that these dicarboxylic acid compounds are subjected to reaction in the form of acid chloride or ester.

When producing polyestercarbonate, the dicarboxylic acid compound can be used in an amount of 0.5-45 mol %, more preferably 1-40 mol % based upon 100 mol % of the total amount of the dihydroxy components and dicarboxylic acid components.

It is preferable that at least a part of the above-mentioned aromatic polycarbonate prepolymer is terminally end-capped.

The content of the end-capped terminal groups consisting of aromatic monohydroxy compound based upon the total amount of the terminals of the above-mentioned aromatic polycarbonate prepolymer is preferably 60 mol % or more, whereby the specific effect of the present invention can be exhibited remarkably.

The content of the end-capped terminal groups based upon the total amount of the terminal groups of polymer can be analyzed by $^1$H-NMR analysis of polymer. It is also possible to obtain said content by analyzing the concentration of terminal hydroxy groups by spectrometric measurement using Ti complex or by $^1$H-NMR analysis. The concentration of terminal hydroxy groups of the aromatic polycarbonate prepolymer of the present invention obtained by this measurement is preferably 1,500 ppm or less, more preferably 1,000 ppm or less.

Since the linking and highly polymerizing reaction between the aromatic polycarbonate prepolymer and the aliphatic diol compound of the present invention is transesterification reaction, the concentration of terminal hydroxy groups higher than the above range or the content of the end-capped terminal groups lower than the above range might cause difficulty in obtaining a polymer having sufficiently high molecular weight by said linking and highly polymerizing reaction. In addition, a sufficient correlation between the amount of the branching agent used and the degree of branching of the branched high-molecular-weight aromatic polycarbonate resin thus obtained might not be established.

Examples of the end-capped terminal groups include a phenyl terminal group, a cresyl terminal group, an o-tolyl terminal group, a p-tolyl terminal group, a p-t-butylphenyl terminal group, a biphenyl terminal group, an o-methoxycarbonylphenyl terminal group and a p-cumylphenyl terminal group.

Among them, a terminal group derived from an aromatic monohydroxy compound having a low boiling point which can be easily removed from the reaction system of the linking reaction described below is preferable. A phenyl terminal group or a p-tert-butylphenyl terminal group is more preferable.

In the case of interfacial polymerization, the end-capped terminal group can be introduced by using a terminal terminating agent at the time of producing the aromatic polycarbonate prepolymer. Examples of the terminal terminating agents include p-tert-butyl phenol. The amount of the terminal terminating agent used can be determined properly according to the intended content of terminal groups of the aromatic polycarbonate prepolymer which means the desired molecular weight of the aromatic polycarbonate prepolymer, the reaction apparatus to be used, reaction conditions or the like.

In the case of melt polymerization, the end-capped terminal groups can be introduced by using diester carbonate such as diphenyl carbonate in an amount excess to the aromatic dihydroxy compound at the time of producing the aromatic polycarbonate prepolymer.

Regarding the molecular weight of the aromatic polycarbonate prepolymer, it is preferable that the weight average molecular weight (Mw) thereof is in the range from 5,000 to 60,000, more preferably in the range from 10,000 to 50,000, most preferably in the range from 10,000 to 40,000.

When the molecular weight of the aromatic polycarbonate prepolymer is too lower, influence of copolymerizing components on the properties of the resin might become serious. Though it may be possible to modify the properties, it might be improper as the effect of highly polymerization of the aromatic polycarbonate prepolymer having a branched structure introduced. In addition, a sufficient correlation between the amount of the branching agent used and the degree of branching of the branched high-molecular-weight aromatic polycarbonate resin thus obtained might not be established.

When the molecular weight of the aromatic polycarbonate prepolymer is too high, the concentration of active terminals might be declined and the effect of highly polymerization might be insufficient.

In addition, since the aromatic polycarbonate prepolymer itself has high viscosity, it might be necessary to employ the reaction conditions of high temperature and high shearing for long time. As a result, since unexpected branched or crosslinked structures might be generated naturally in the prepolymer itself, it would be unfavorable for the purpose of obtaining a branched aromatic polycarbonate resin of high quality. Furthermore, a sufficient correlation between the amount of the branching agent used and the degree of branching of the branched high-molecular-weight aromatic polycarbonate resin thus obtained might not be established.

(5) Aliphatic Diol Compound

The process for manufacturing according to the present invention comprises a process of carrying out linking and highly polymerizing reaction of the above-mentioned aromatic polycarbonate prepolymer with an aliphatic diol compound under reduced pressure in the presence of a transesterification catalyst.

That is, by reacting the above-mentioned aromatic polycarbonate prepolymer with an aliphatic diol compound, the end-capped terminal groups present in the aromatic polycarbonate prepolymer which is derived from the aromatic dihydroxy compound is replaced by an alcoholic hydroxy group, thereby the linking reaction among the aromatic polycarbonate prepolymer molecules having a branched structure introduced is promoted to increase the molecular weight.

In the branched aromatic polycarbonate resin which is highly polymerized by the above process, there is a certain level of correlation between the degree of branching and the amount of the branching agent used at the time of introducing the branched structure into the aromatic polycarbonate prepolymer.

Thus, the degree of branching can be adjusted in accordance with the amount of the branching agent used even in melt polymerization, and as a result, a branched high-molecular-weight aromatic polycarbonate resin having a desired degree of branching can be manufactured easily by melt polymerization using conventional conditions of a transesterification method without seeking a particular kind of equipment and/or operating conditions.

The aliphatic diol compound to be used for the present invention is a compound having aliphatic hydrocarbon groups bonding to terminal OH groups. Examples of the aliphatic hydrocarbon groups include an alkylene group and a cycloalkylene group which may be substituted in part by aromatic groups, heterocyclic ring-containing groups or the like.

More precisely, Examples of the aliphatic hydrocarbon groups include a dihydric compound having alcoholic hydroxy groups represented by the following general formula (I):

$$HO-(CR_1R_2)_n-Q-(CR_3R_4)_m-OH \quad (I)$$

In the above general formula (I), "Q" represents a hydrocarbon group having at least 3 carbon atoms which may contain atoms of a different kind, preferably a hydrocarbon group having 6 to 40 carbon atoms which may contain atoms of a different kind, more preferably a hydrocarbon group having 6 to 30 carbon atoms which may contain atoms of a different kind.

Examples of the atoms of a different kind include an oxygen atom (O), a sulfur atom (S), a nitrogen atom (N), a fluorine atom (F) and a silicon atom (Si). Among them, an oxygen atom (O) and a sulfur atom (S) are most preferable.

The hydrocarbon group can be strait chain (linear), branched or circular. "Q" can contain a cyclic structure such as an aromatic ring and a heterocyclic ring.

In the above general formula (I), $R_1$, $R_2$, $R_3$ and $R_4$ each independently represent a group selected from the group consisting of a hydrogen atom, an aliphatic hydrocarbon group having 1-30 carbon atoms, preferably 1-10 carbon atoms, and an aromatic hydrocarbon group having 6-20 carbon atoms, preferably 6-10 carbon atoms.

Examples of the aliphatic hydrocarbon groups include a linear or branched alkyl group and a cyclohexyl group. Examples of the alkyl groups include a methyl group, an ethyl group, a propyl group, an isopropyl group, a n-butyl group, an i-butyl group, at-butyl group, an-amyl group, an isoamyl group, a n-hexyl group, and an isohexyl group. Examples of the aromatic hydrocarbon groups include a phenyl group and a naphthyl group.

In this regard, at least one of $R_1$ and $R_2$ and at least one of $R_3$ and $R_4$ are each independently selected from the group consisting of a hydrogen atom and an aliphatic hydrocarbon group.

"n" and "m" each independently represent an integer of 0-10, preferably an integer of 0-4.

In the case that Q contains no aliphatic hydrocarbon groups binding to the terminal hydroxy groups, "n" and "m" each independently represent an integer of 1-10, preferably an integer of 1-4.

Examples of the terminal structures "HO—$(CR_1R_2)_n$—" and "—$(CR_3R_4)_m$—OH" include the following structures:

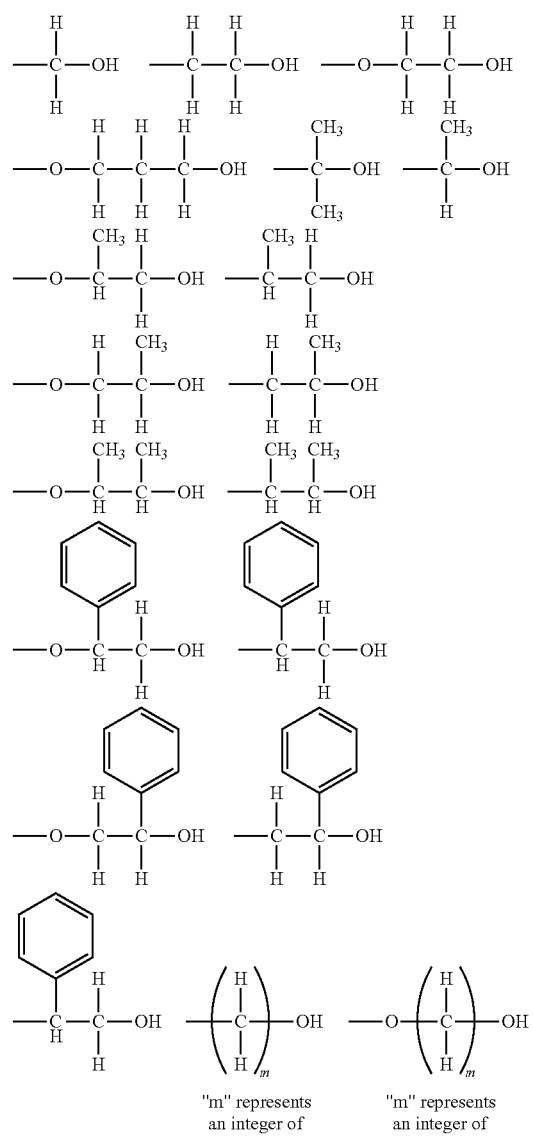

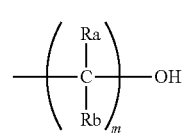

Ra and Rb each represent a hydrogen atom, a linear or branched alkyl group, a phenyl group or a naphthyl group. "m" represents an integer of 1 or more.

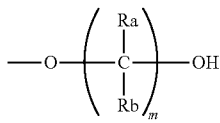

Ra and Rb each represent a hydrogen atom, a linear or branched alkyl group, a phenyl group or a naphthyl group. "m" represents an integer of 1 or more.

It is most preferable that all of $R_1$, $R_2$, $R_3$ and $R_4$ are hydrogen atoms. That is, the aliphatic diol compound used in the present invention is preferably a primary diol compound, more preferably a primary diol compound except a linear aliphatic diol compound.

More preferable examples of the aliphatic diol compounds to be used for the present invention include dihydric compounds having alcoholic hydroxy groups represented by any one of the following formulas (i) to (iii):

$$HO-(CR_1R_2)_{n1}-Q_1-(CR_3R_4)_{m1}-OH \qquad (i)$$

$$HO-(CR_1R_2)_{n2}-Q_2-(CR_3R_4)_{m2}-OH \qquad (ii)$$

$$HO-(CR_1R_2)_{n3}-Q_3-(CR_3R_4)_{m3}-OH \qquad (iii)$$

In the above formula (1), $Q_1$ represents a hydrocarbon group having 6-40 carbon atoms containing aromatic ring(s), preferably a hydrocarbon group having 6-30 carbon atoms containing aromatic ring(s). $Q_1$ can contain at least one of different kind atoms selected from the group consisting of an oxygen atom (O), a sulfur atom (S), a nitrogen atom (N), a fluorine atom (F) and a silicon atom (Si).

In the formula (i), "n1" and "m1" each independently represent an integer of 1-10, preferably an integer of 1-4.

Examples of the aromatic rings include a phenyl group, a biphenyl group, a fluorenyl group and a naphthyl group.

In the above formula (ii), Q2 represents a linear or branched hydrocarbon group having 3-40 carbon atoms which may contain heterocyclic ring(s), preferably a linear or branched hydrocarbon group having 5-30 carbon atoms which may contain heterocyclic ring(s), more preferably a linear or branched hydrocarbon group having 7-20 carbon atoms which may contain heterocyclic ring(s).

Q2 can contain at least one of different kind atoms selected from the group consisting of an oxygen atom (O), a sulfur atom (S), a nitrogen atom (N), a fluorine atom (F) and a silicon atom (Si). "n2" and "m2" each independently represent an integer of 1-10, preferably an integer of 1-4.

In the above formula (iii), Q3 represents a cyclic hydrocarbon group or a cycloalkylene group having 6-40 carbon atoms, preferably having 6-30 carbon atoms. "n3" and "m3" each independently represent an integer of 0-10, preferably an integer of 1-4. Examples of the cycloalkylene groups include a cyclohexylene group, a bicyclodecanyl group and a tricyclodecanyl group.

In the above formulas (i) to (iii), $R_1$, $R_2$, $R_3$ and $R_4$ each independently represent a group selected from the group consisting of a hydrogen atom, an aliphatic hydrocarbon group having 1-30 carbon atoms, preferably 1-10 carbon atoms, and an aromatic hydrocarbon group having 6-20 carbon atoms, preferably 6-10 carbon atoms. Examples of $R_1$ to $R_4$ are same as those in the above-mentioned general formula (I).

Among the aliphatic diol compounds represented by any one of the formulas (i) to (iii), it is more preferable to use a compound represented by the formulas (i) or (iii). It is most preferably to use a compound represented by the formula (iii).

In light of the distillation process to remove an aromatic monohydroxy compound produced as a by-product by the reaction between the aromatic polycarbonate prepolymer with the aliphatic diol compound, it is preferable to use an aliphatic diol compound having the boiling point higher than that of said aromatic monohydroxy compound.

In addition, since it is necessary to promote the reaction steadily without volatilizing under a certain temperature and pressure, it is preferable to use an aliphatic diol compound having a relatively high boiling point. More precisely, therefore, it is desirable to use an aliphatic diol compound having a boiling point of 240° C. or higher, preferably 250° C. or higher, most preferably 350° C. or higher at normal pressure.

The upper limit of the boiling point of the aliphatic diol compound to be used for the present invention is not particularly limited, and the compound having a boiling point of 500° C. or lower can be used sufficiently.

Using an aliphatic diol compound having relatively high boiling point enables to employ the process of the present invention which comprises a process of continuously feeding the aliphatic diol compound into a reactor of linking and highly polymerizing reaction under reduced pressure of 10 torr or less, and also to inhibit volatilization of the aliphatic diol compound during the manufacturing process.

Thereby, since the amount of aliphatic diol compound contributing to the linking and highly polymerizing reaction would be increased, it would not be necessary to use an excess amount of the aliphatic diol compound which enables to improve economic efficiency.

Employable examples of the aliphatic diol compounds to be used for the present invention include compounds having structures shown as follows:

(i) Primary Diols; 2-Hydroxyethoxy Group-Containing Compounds

Preferable examples of the aliphatic diol compounds of the present invention include a 2-hydroxyethoxy group-containing compound represented by [HO—$(CH_2)_2$—O—Y—O—$(CH_2)_2$—OH], wherein "Y" is selected from the group consisting of an organic group represented by the following structure (A), an organic group represented by the following structure (B), a divalent organic group represented by the following structure (C) which is a phenylene group or a naphthylene group and a cycloalkylene group represented by the following structure (D):

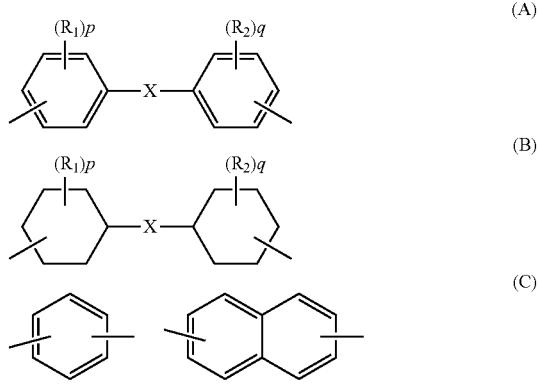

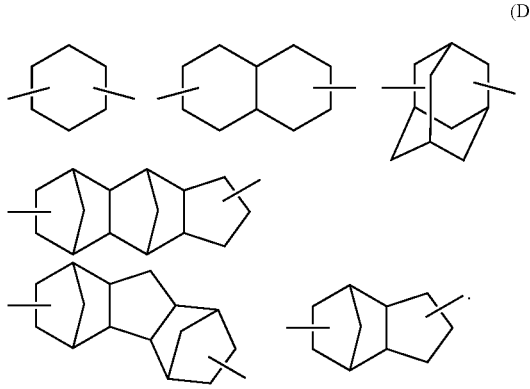

In the above structural formulas, X represents a single bond or a group having the structures shown below. $R_1$ and $R_2$ each independently represent a hydrogen atom, an alkyl group having 1-4 carbon atoms, a phenyl group or a cyclohexyl group, which may contain a fluorine atom. Preferable examples of $R_1$ and $R_2$ include a hydrogen atom and a methyl group. "p" and "q" each independently represent an integer of 0-4, preferably 0-3.

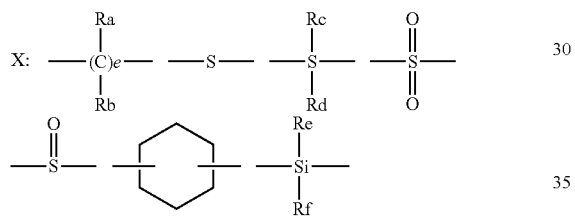

In the above structures, Ra and Rb each independently represent a hydrogen atom, a linear or branched alkyl group having 1-30, preferably 1-12, more preferably 1-6, most preferably 1-4 carbon atoms, an aryl group having 6-12 carbon atoms or a cycloalkyl group having 6-12 carbon atoms. Ra and Rb can be linked with each other to form a ring. Examples of the ring include an aromatic ring, an alicyclic ring, a heterocyclic ring containing O and/or S, and arbitrary combinations of them.

When Ra and Rb are an alkyl group or are linked with each other to form a ring, they can contain fluorine atoms.

Rc and Rd each independently represent an alkyl group having 1-10, preferably 1-6, more preferably 1-4 carbon atoms, which may contain a fluorine atom. Preferably, Rc and Rd are a methyl group or an ethyl group. "e" represents an integer of 1-20, preferably 1-12.

More specific examples of the aliphatic diol compounds are shown below. In the formulas shown below, "n" and "m" each independently represent an integer of 0-4. $R_1$ and $R_2$ each independently represent a hydrogen atom, a methyl group, an ethyl group, a n-propyl group, an isopropyl group, a butyl group, an isobutyl group, a phenyl group or a cyclohexyl group.

<Y: Organic Group (A)>

Preferable examples of the aliphatic diol compounds in the case that Y is the organic group represented by the above structure (A) are shown below.

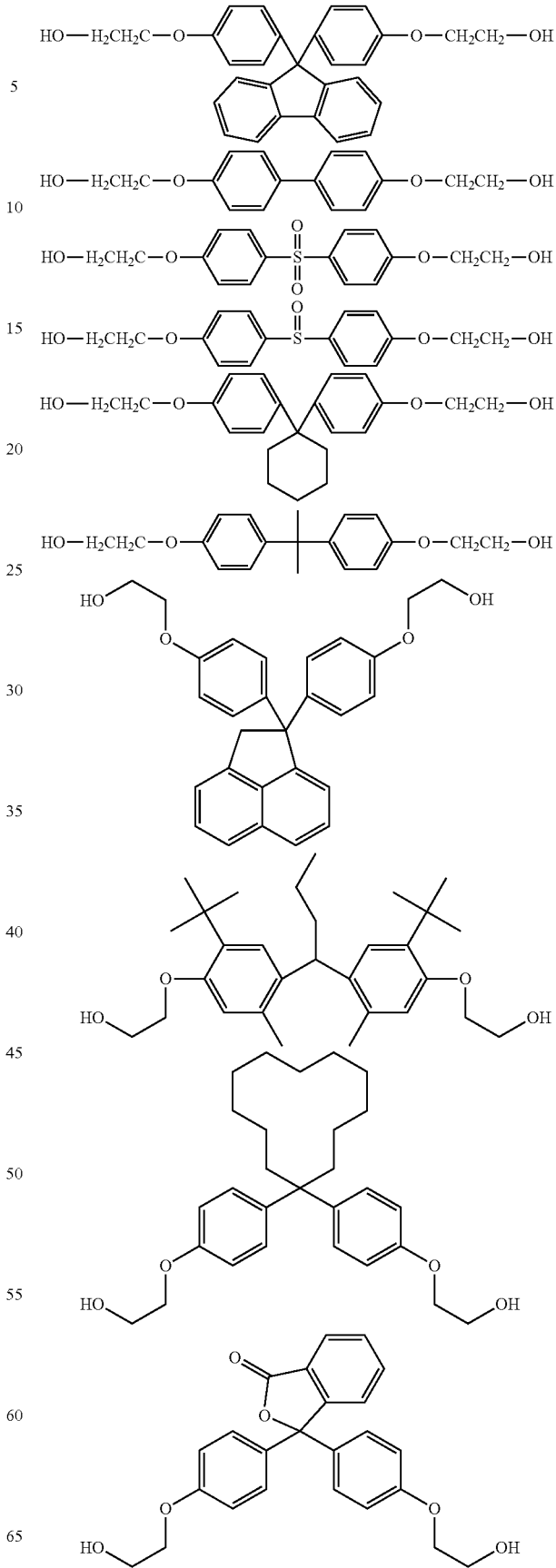

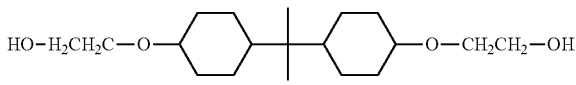

<Y: Organic Group (C)>

Preferable examples of the aliphatic diol compounds in the case that Y is the organic group represented by the above structure (C) are shown below.

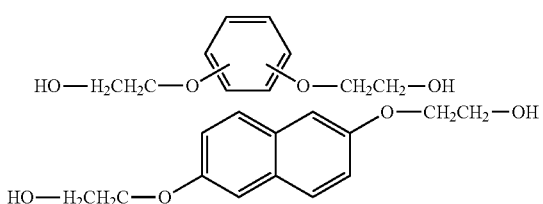

Most preferable compounds among the above-shown 2-hydroxyethoxy group-containing compounds are shown below.

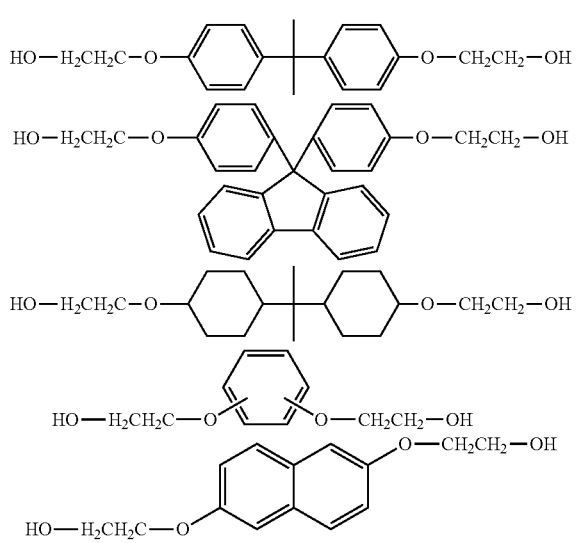

(ii) Primary Diols; Hydroxyalkyl Group-Containing Compound

Preferable examples of the aliphatic diol compounds of the present invention include a hydroxyalkyl group-containing compound represented by [HO—$(CH_2)_r$—Z—$(CH_2)_r$—OH], wherein "r" is an integer of 1 or 2. That is, preferable hydroxyalkyl groups include a hydroxymethyl group and a hydroxyethyl group.

Examples of "Z" include organic groups shown below.

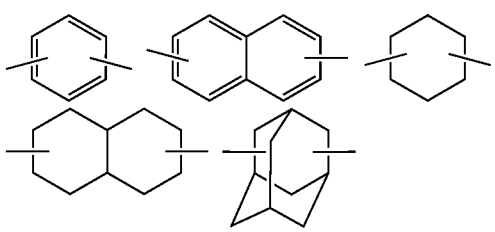

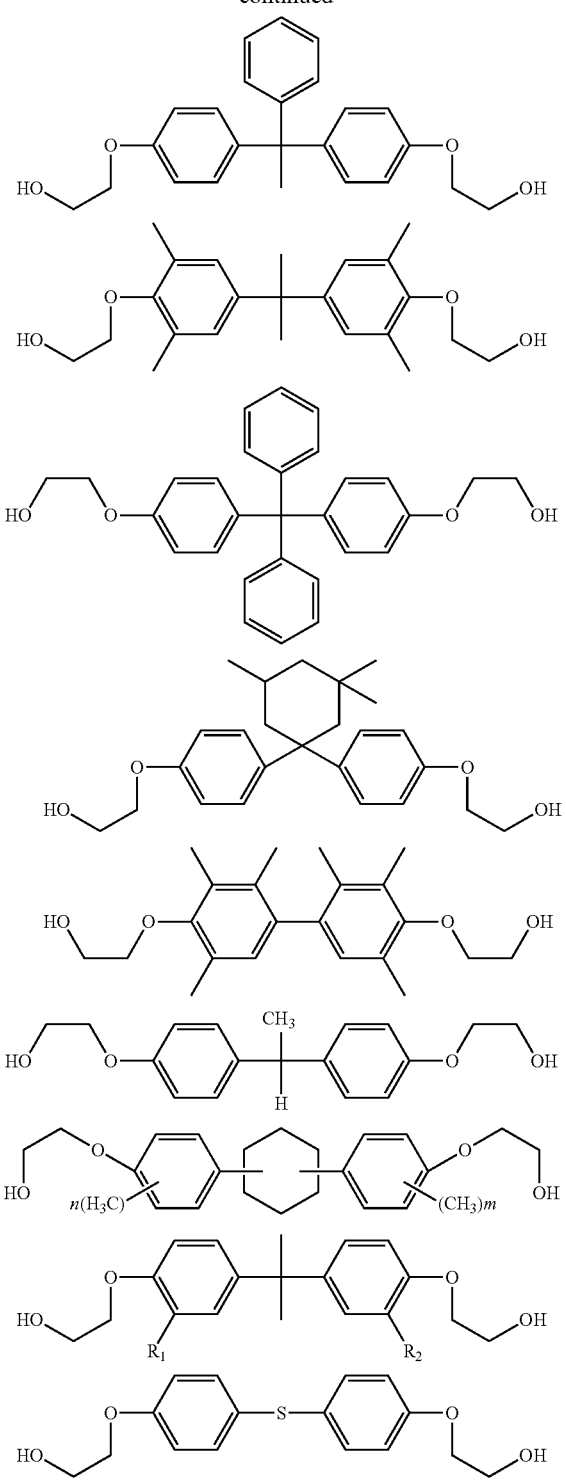

<Y: Organic Group (B)>

In the case that Y is the above-mentioned organic group represented by the above structure (B), X in the structure (B) is preferably represented by [—CRaRb—] wherein Ra and Rb each independently represent a hydrogen atom or an alkyl group having 1-6 carbon atoms, preferably a methyl group. Examples of this type of aliphatic diol compounds are shown below.

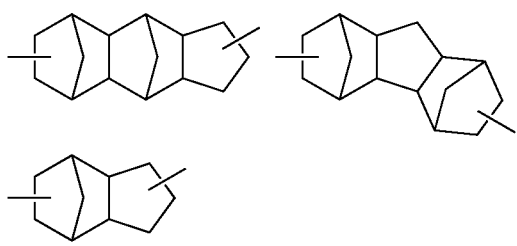
Preferable examples of the hydroxyalkyl group-containing compounds are shown below, wherein "n" and "m" each independently represent an integer of 0-4.
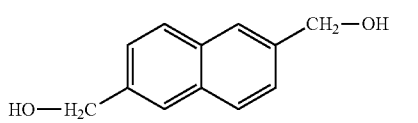
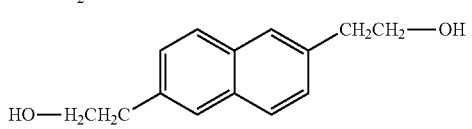
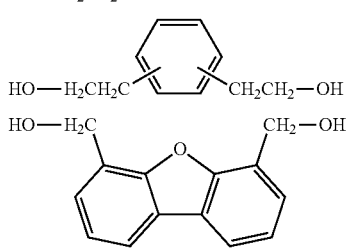
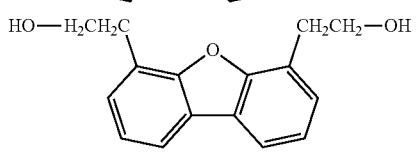
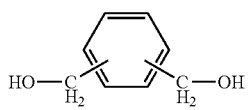
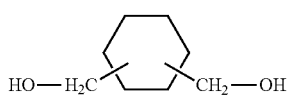
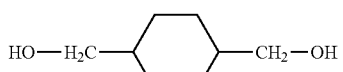
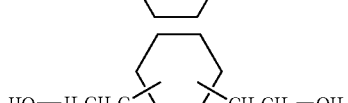
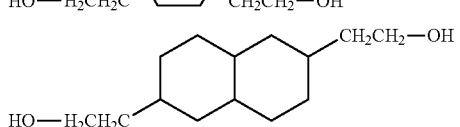
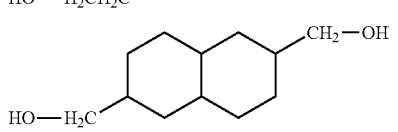
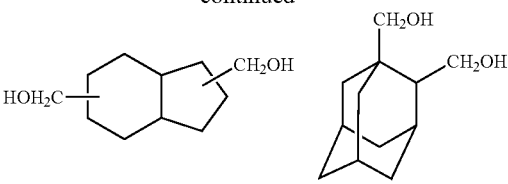
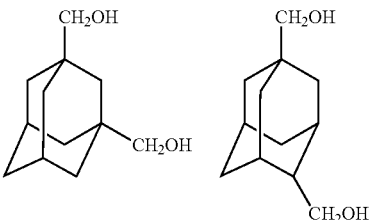
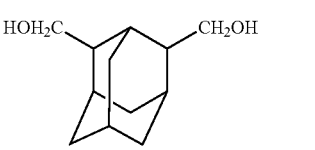
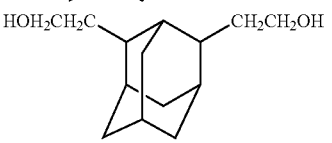
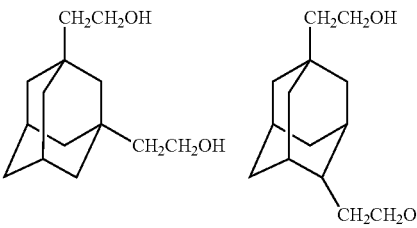
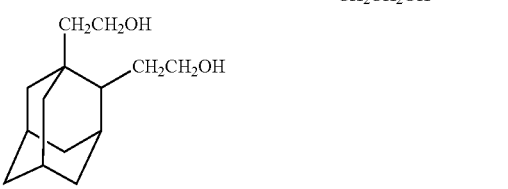
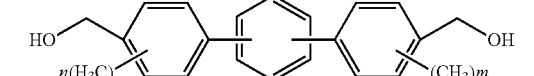
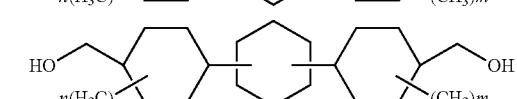
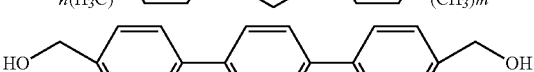
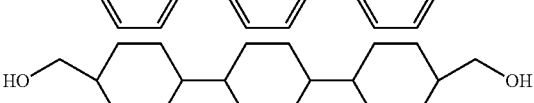
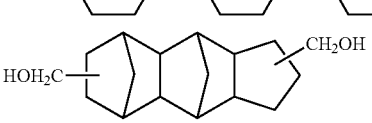
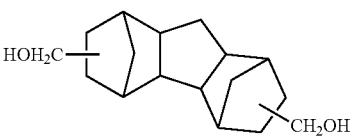

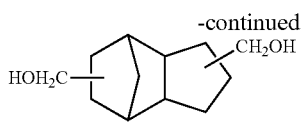

(iii) Primary Diol; Carbonate Diol Compound

Preferable examples of the aliphatic diol compounds of the present invention also include a carbonate diol compound represented by the following structures, wherein R represents an organic group shown below, "n" represents an integer of 1-20, preferably 1-2 and "m" represents an integer of 3-20, preferably 3-10:

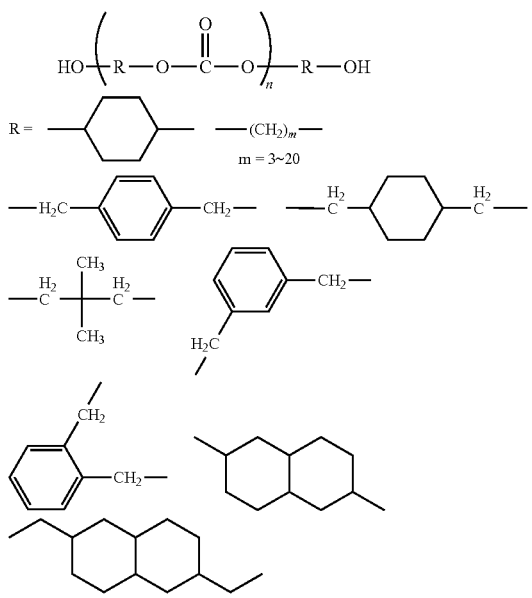

Preferable examples of the above-mentioned carbonate diol compounds include the following diols, especially cyclohexanedimethanol or a neopentylglycol dimer, or a mixture including them as a main component.

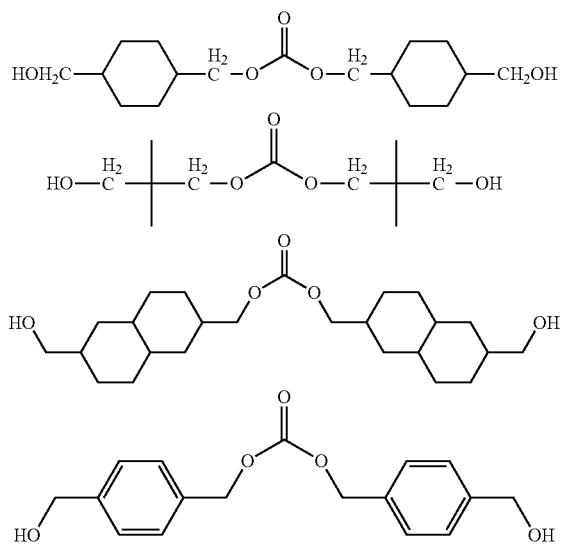

It is preferable to use a primary diol selected from the group consisting of (i) a 2-hydroxyethoxy group-containing compound, (ii) a hydroxyalkyl group-containing compound and (iii) a carbonate diol compound as the aliphatic diol compound to be used for the present invention.

The aliphatic diol compound to be used for the present invention should not be limited to the above-mentioned compounds. Employable examples of the aliphatic diol compounds also remain among primary diols other than the above-mentioned primary diols or among secondary diols. Employable examples of the other primary diols or secondary diols are shown below.

In the structural formulas below, $R_5$, $R_6$, $R_7$ and $R_8$ each independently represent a hydrogen atom or a monovalent alkyl group having 1-10 carbon atoms, $R_9$ and $R_{10}$ each independently represent a linear or branched alkyl group having 1-8, preferably 1-4 carbon atoms.

Ra and Rb are same as above. R' represents an alkylene group having 1-10, preferably 1-8 carbon atoms, Re and Rf each independently represent a hydrogen atom, a methyl group, an ethyl group, a n-propyl group, an isopropyl group, a butyl group, an isobutyl group or a phenyl group, m" represents an integer of 1-10, preferably 1-5 and "e" represents an integer of 1-10.

<Other Primary Diols>

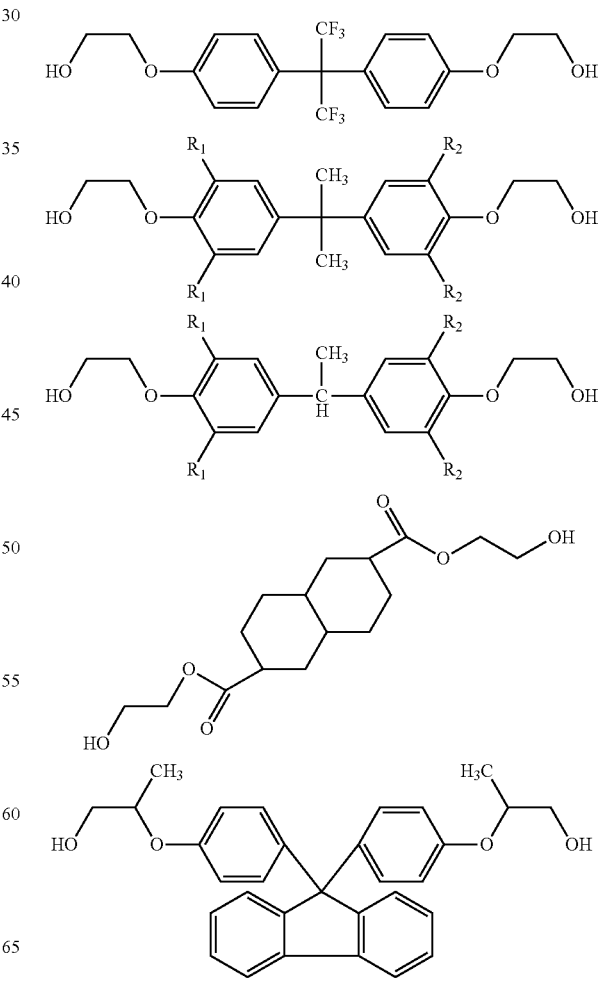

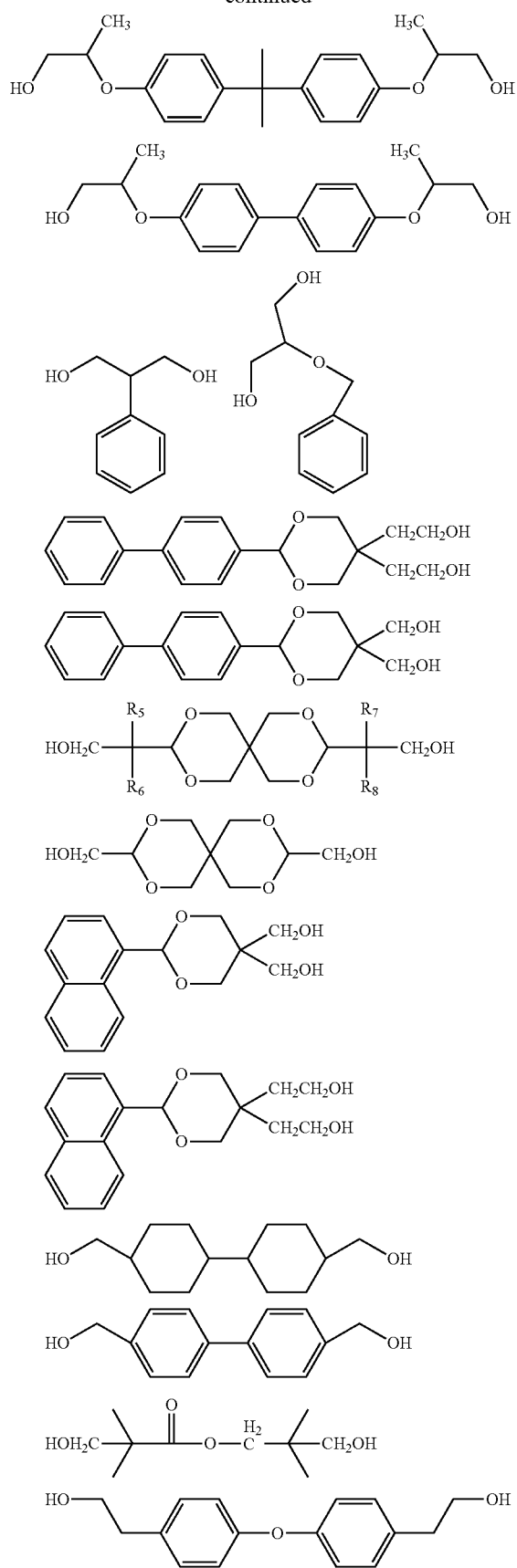
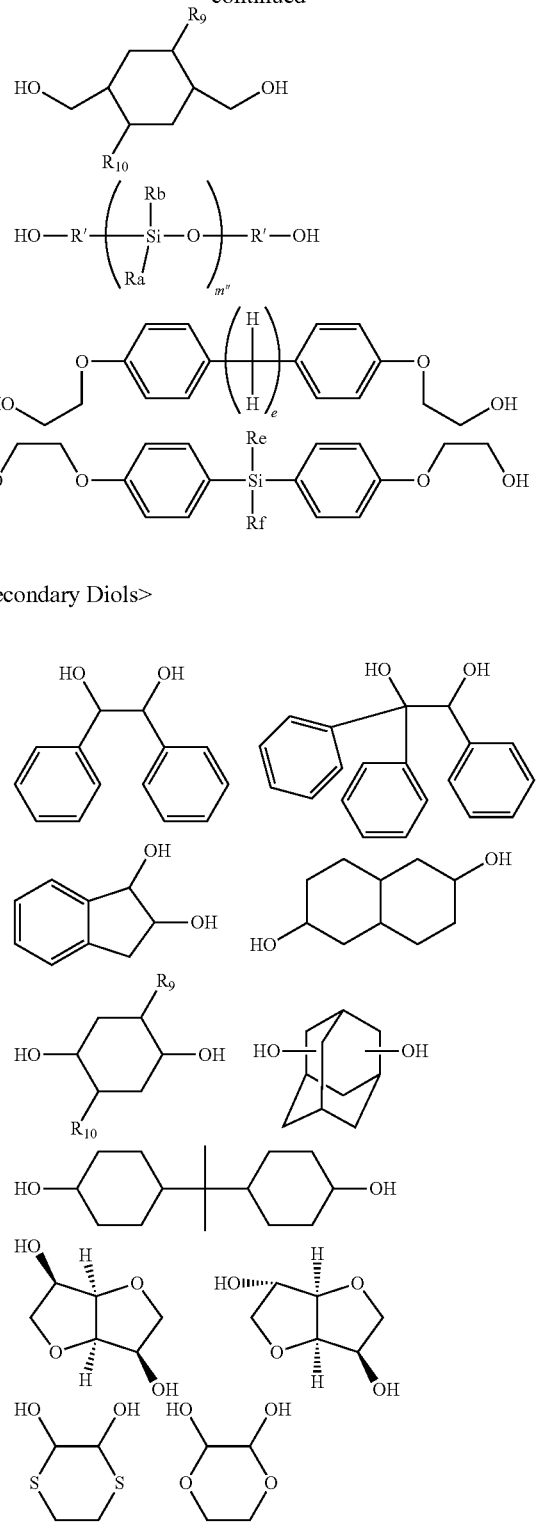

<Secondary Diols>

The above aliphatic diol compounds can be used each independently, or two or more of them can be used in combination with each other. The aliphatic diol compound to be practically used can be selected in accordance with the reaction conditions employed or the like, since available compound species may vary depending on the reaction conditions or the like.

Most preferable examples of the aliphatic diol compound to be used include decalin-2,6-dimethanol (DDM), pentacyclopentadecane dimethanol, 4,4'-bis(2-hydroxyethoxy)biphenyl, 2,2'-bis[(2-hydroxyethoxy)phenyl]propane (BPA-2EO), 9,9-bis[4-(2-hydroxyethoxy)phenyl]fluorene (BPEF), fluorene glycol, fluorene diethanol, and 1,4-cyclohexanedimethanol (CHDM).

The amount of the aliphatic diol compound to be used according to the present invention is preferably 0.01 to 1.0 mole, more preferably 0.1 to 1.0 mole, further preferably 0.2 to 0.7 mole, most preferably 0.2 to 0.4 mole per mole of the total amount of the terminal groups of the aromatic polycarbonate prepolymer.

When the amount of the aliphatic diol compound to be used is too large beyond the above range, the rate of comonomer component might increase caused by insertion reaction wherein the aliphatic diol compound is inserted into the main chain of the branched aromatic polycarbonate resin as a comonomer component, and the influence of the comonomer component on the polymer properties might become significant. Though it may be possible to modify the properties, it might be improper as the effect of highly polymerization of the aromatic polycarbonate prepolymer having a branched structure introduced. In addition, when the amount of the aliphatic diol compound to be used is too large beyond the above range, the effect of highly polymerization might not be enough, and as a result, a sufficient correlation between the amount of the branching agent used and the degree of branching of the branched high-molecular-weight aromatic polycarbonate resin thus obtained might not be established.

According to the present invention, "total amount of terminal groups of polycarbonate" or "total amount of terminal groups of polymer" is calculated on the assumption that, for example, the total amount of the terminal groups of 0.5 mol of polycarbonate having no branched structure or having a linear structure is 1 mol, since the number of terminal groups per molecule of polycarbonate having no branched structure or having a linear structure is two. In the case of polycarbonate having a branched structure, the terminal groups of the branched chain is contained in the amount of terminal groups.

The total amount of terminal groups containing the terminal groups of branched chain can be derived from $^1$H-NMR analysis, a calculation from a molecular weight, the amount of a branching agent used and the like.

It is desirable that the content of chlorine, nitrogen, alkali metals, and heavy metals contained in the aliphatic diol compound as impurities are low. Examples of the alkali metals include sodium, potassium and salts or derivatives thereof. Examples of the heavy metals include iron, nickel and chromium.

The preferable contents of these impurities are as follows:
The content of chlorine is preferably 1000 ppm or less. The content of nitrogen is preferably 100 ppm or less. The content of alkali metals is preferably 10 ppm or less.

Regarding heavy metals, the content of iron is preferably 3 ppm or less, the content of nickel is preferably 2 ppm or less and the content of chromium is preferably 1 ppm or less.

(6) Linking and Highly-Polymerizing Reaction with Aliphatic Diol Compound:

According to the present invention, the aromatic polycarbonate prepolymer having a branched structure introduced is subjected to linking and highly-polymerizing reaction with the above-mentioned aliphatic diol compound having aliphatic hydrocarbon groups bonding to terminal OH groups in the presence of a transesterification catalyst under reduced pressure.

Examples of catalysts to be used for the linking and highly-polymerizing reaction include a basic compound catalyst and a transesterification catalyst which are commonly used for manufacturing polycarbonate.

Examples of the basic compound catalyst include alkali metal compounds and/or alkali earth metal compounds, and nitrogen-containing compounds.

Preferable examples of alkali metal compounds and/or alkali earth metal compounds include organic acid salts, inorganic salts, oxide, hydroxide, hydride, alkoxide, quaternary ammonium hydroxide and salts thereof and amines of alkali metals and alkali earth metals. These compounds can be used each independently or two or more of them can be used in combination with each other.

Examples of alkali metal compounds include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium boron hydride, sodium phenylborate, sodium benzoate, potassium benzoate, cesium benzoate, lithium benzoate, disodium hydrogenphosphate, dipotassium hydrogenphosphate, dilithium hydrogenphosphate, disodium phenylphosphate, a disodium salt of bisphenol A, a dipotassium salt of bisphenol A, a dicesium salt of bisphenol A and a dilithium salt of bisphenol A, a sodium salt of phenol, a potassium salt of phenol, a cesium salt of phenol, a lithium salt of phenol.

Examples of alkali earth metal compounds include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate and magnesium phenylphosphate.

Examples of nitrogen-containing compounds include quaternary ammonium hydroxides containing alkyl groups and/or aryl groups such as tetramethyl ammonium hydroxide, tetraethyl ammonium hydroxide, tetrapropyl ammonium hydroxide, tetrabutyl ammonium hydroxide and trimethylbenzyl ammonium hydroxide; tertiary amines such as triethylamine, dimethylbenzylamine and triphenylamine; secondary amines such as diethylamine and dibutylamine; primary amines such as propylamine and butylamine; imidazoles such as 2-methylimidazole, 2-phenylimidazole and benzoimidazole; and a base or a basic salt such as ammonia, tetramethyl ammonium borohydride, tetrabutyl ammonium borohydride, tetrabutyl ammonium tetraphenylborate and tetraphenyl ammonium tetraphenylborate.

Regarding the transesterification catalyst, salts of zinc, tin, zirconium or lead can be preferably used. They can be used each independently or two or more of them can be used in combination with each other.

Examples of the transesterification catalysts include zinc acetate, zinc benzoate, zinc 2-ethylhexanoate, tin chloride (II), tin chloride (IV), tin acetate (II), tin acetate (IV), dibutyltin dilaurate, dibutyltin oxide, dibutyltin dimethoxide, zirconium acetylacetonate, zirconium oxyacetate, zirconium tetrabutoxide, lead acetate (II) and lead acetate (IV).

These catalysts can be used in an amount of preferably $1\times10^{-9}$ to $1\times10^{-3}$ mole, more preferably $1\times10^{-7}$ to $1\times10^{-5}$ mole per mole of the total amount of dihydroxy compounds.

The temperature of the linking and highly-polymerizing reaction by the aliphatic diol compound is preferably in the range of 240° C. to 320° C., more preferably in the range of 260° C. to 310° C., most preferably in the range of 270° C. to 300° C.

The degree of pressure reduction is preferably in the range of 13 kPaA (100 torr) or less, more preferably in the range of 1.3 kPaA (10 torr) or less, further preferably in the range from 0.67 kPaA to 0.013 kPaA (from 5 torr to 0.1 torr). When the inking and highly-polymerizing reaction is carried out under normal pressure, molecular weight decreasing of polymer might be induced.

By using the aliphatic diol compound, the weight average molecular weight (Mw) of the branched aromatic polycarbonate resin can be increased by 5,000 or more, more preferably by 10,000 or more, further preferably 15,000 or more compared to the weight average molecular weight (Mw) of the aromatic polycarbonate prepolymer.

While the weight average molecular weight (Mw) of the branched aromatic polycarbonate resin of the present invention is not particularly limited, it is preferably 30,000-100,000, more preferably 30,000-80,000.

The degree of branching of the branched aromatic polycarbonate resin according to the present invention is evaluated by a structural viscosity index, "N-value".

N-value is represented by the following mathematical formula (I) using Q160 which is a melting fluid volume per unit time measured under 280° C. and 160 kg load and Q10 which is a melting fluid volume per unit time measured under 280° C. and 10 kg load.

$$N\text{-value}=(\log(Q160)-\log(Q10))/(\log 160 - \log 10) \quad (I)$$

In the above mathematical formula (I), Q160 represents a melting fluid volume per unit time (ml/sec) measured under the conditions of 280° C. and 160 kg load by using a measuring instrument manufactured by Shimadzu Corporation, trade name "CFT-500D", with the stroke of 7.0-10.0 mm and the nozzle size of 1 mm (diameter))×10 mm(length).

In the above mathematical formula (I), Q10 represents a melting fluid volume per unit time (ml/sec) measured under the conditions of 280° C. and 10 kg load by using a measuring instrument manufactured by Shimadzu Corporation, trade name "CFT-500D", with the stroke of 7.0-10.0 mm and the nozzle size of 1 mm (diameter))×10 mm(length)

While a straight-chain aromatic polycarbonate obtained by interfacial polymerization has N-value of 1.1-1.4 usually, the aromatic polycarbonate polymer obtained by melt polymerization has N-value of 1.3-2.0 even by using no branching agents because of decrease in quality caused by heat deterioration during the manufacturing process.

The N-value in this case is not a controlled N-value. The N-value would increase depending on the degree of deterioration of resin during the manufacturing process and it is unable to be controlled.

The N-value (N) of the branched aromatic polycarbonate resin of the present invention, on the other hand, has an approximately proportional relation with the amount (A) of the branching agent used during the manufacturing process of the aromatic polycarbonate prepolymer. More precisely, it has a correlation represented by the following mathematical formula (II):

$$N=K_1 A+K_2 \quad (II)$$

In the above mathematical formula (II), $K_1$ represents a constant number from 0.1 to 2.0, preferably 0.3 to 1.6 with no unit. $K_2$ represents a constant number from 1.05 to 1.5 preferably 1.1 to 1.4 with no unit.

According to the present invention, as mentioned above, since the amount (A) of the branching agent used during the manufacturing process of the aromatic polycarbonate prepolymer and the degree of branching (N-value) exhibit a certain level of correlation, it is possible to adjust the degree of branching of the branched aromatic polycarbonate resin by controlling the amount of the branching agent used during the manufacturing process of the aromatic polycarbonate prepolymer.

More precisely, it is possible to adjust the degree of branching (N-value) of the branched aromatic polycarbonate resin obtained by the process of the present invention to an intended value within the range of 1.1 to 2.2, more preferably within the range of 1.2 to 2.0, further preferably within the range of 1.2 to 1.9, most preferably within the range of 1.26 to 1.9.

The color tone of an aromatic polycarbonate resin is evaluated by a YI-value in general. A branched aromatic polycarbonate resin obtained by interfacial polymerization usually has the YI-value of 0.8-1.0. A conventional highly polymerized aromatic polycarbonate resin obtained by melt polymerization usually has the YI-value of 1.7-2.0 because of decrease in quality during the manufacturing process.

The branched aromatic polycarbonate resin obtained by the process of the present invention has the YI-value comparable to the aromatic polycarbonate resin obtained by interfacial polymerization, and deterioration in color tone is not observed.

The type of apparatus or materials of reactors for highly polymerization reaction are not particularly limited and any of the known apparatus and/or materials can be used. Any type of continuous polymerization or batch polymerization can be employed. The reaction apparatus used for carrying out the above-mentioned reaction can be a vertical reactor equipped with an anchor blade, a Maxblend impeller, a helical ribbon blade or the like, or can be a horizontal reactor equipped with a paddle blade, a lattice blade, a spectacle-shaped blade or the like, or can be an extruder equipped with a screw. In addition, it is desirable to use a reaction apparatus wherein the above-mentioned apparatuses are properly combined with each other taking viscosity of the polymer in consideration.

It is more desirable to use a reaction apparatus equipped with a screw having a good horizontal stirring efficiency and a unit capable of dealing with reduced pressure.

It is further desirable to use a biaxial extruder or a horizontal reactor having a polymer seal and a vent.

Regarding the materials of the apparatus, it is desirable to use a material which has no influence on the color tone of the polymer such as stainless steel selected from SUS310, SUS316, SUS304 or the like, nickel and iron nitride. In addition, a buff processing, an electropolishing processing and/or metal plating such as chromium plating can be applied on the inner side of the apparatus which is a part contacting with polymer.

According to the present invention, a catalyst deactivator can be added to the polymer highly-polymerized by the above-mentioned highly polymerizing reaction. It is desirable, in general, to employ a method of adding known acid materials to deactivate catalyst. Examples of the acid materials include aromatic sulfonic acid such as p-toluenesulfonic acid, aromatic sulfonic acid esters such as butyl p-toluene-sulfonate, organohalides such as stearic acid chloride, butyric acid chloride, benzoyl chloride and toluenesulfonic acid chloride, alkyl sulfate such as dimethyl sulfate and organohalides such as benzyl chloride.

After deactivating the catalyst, a process to remove low-boiling compounds in the polymer by degassing under reduced pressure ranging from 0.013 to 0.13 kPaA (from 0.1 to 1 torr) at a temperature ranging from 200° C. to 350° C. can be carried out. For carrying out this process, a horizontal reactor equipped with a stirring blade excellent in surface renewability such as a paddle blade, a lattice blade and a spectacle-shaped blade or a thin-film evaporator can preferably be used.

According to the present invention, various additives such as heat stabilizer, antioxidant, pigment, dye enhancing agents, fillers, ultraviolet absorber, lubricant, mold release agents, crystal nucleating agents, plasticizer, fluidability-improving agents and antistatic agents can be added to the polymer.

These additives can be mixed with the polycarbonate resin by a conventional method. For example, a method wherein the components are subjected to dispersion mixing by a rapid mixer such as a tumble mixer, a Henschel mixer, a ribbon blender and a super mixer, and then the mixture is subjected to melting and kneading by an extruder, a banbury mixer, a roll kneader or the like can be employed appropriately.

The branched aromatic polycarbonate resin of the present invention is suitable for molding such as large-scale extrusion molding or various types of blow molding, and is available for materials for various types of molded articles, sheets, films and the like. When used for these materials, the branched aromatic polycarbonate resin of the present invention can be used independently or can be used as a blended material in combination with other resins. It is also preferable for the materials to be subjected to hard coating and/or laminating depending on the intended use.

Examples of the molded articles include optical components such as a headlight lens of a car and a lens on a camera, optical equipment components such as a siren light cover and an illumination lump cover, replacement goods for a window glass of a vehicle such as a train and a car, replacement goods for a window glass of a house, a daylight window components such as a sunroof and a greenhouse roof, lenses or chassis of a goggle, sunglasses and spectacles, packages or chassis of office automation equipment such as a copying machine, a fax machine and a personal computer, chassis of home electric appliances such as a TV set and a microwave oven, electronic components such as a connector and an IC tray, protective equipment such as a helmet, a protector and a protective mask, domestic articles such as dishes and trays, medical goods such as a case for dialysis and artificial denture.

However, these examples are not intended to limit the scope of the present invention.

EXAMPLES

The present invention will be described in more detail below, referring to examples, which are not intended to limit the scope of the present invention.

The measurement values of the examples and comparative examples below were measured by using the following methods and/or devices:

1) Weight-Average Molecular Weight (Mw) in Terms of Polystyrene:

The weight-average molecular weight (Mw) was measured by GPC using chloroform as a developing solvent, an analytical curve was prepared using a standard polystyrene having a known molecular weight (molecular weight distribution=1). Based upon the analytical curve, Mw was calculated from the retention time of GPC.

2) Glass Transition Temperature (Tg):

The glass transition temperature (Tg) was measured by differential scanning calorimeter (DSC).

3) Total Amount of Terminal Groups of Polymer (Mole Number):

0.25 g of a polymer sample was dissolved into 5 ml of deuterated chloroform and then the amount of the terminals was measured at 23° C. by using a nuclear magnetic resonance $^1$H-NMR spectrometer, trade name "LA-500", manufactured by JEOL Ltd. The result was shown as the number of moles per ton of polymer.

4) Concentration of Terminal Hydroxy Groups (ppm):

The concentration of terminal hydroxy groups (ppm) was measured by UV/visible spectroscopy (546 nm) of a complex formed from the polymer and titanium tetrachloride in a methylene chloride solution, or by observing terminal hydroxy groups from the result of $^1$H-NMR analysis.

5) Color Tone of Polymer (YI-Value):

6 g of a polymer sample was dissolved into 60 ml of methylene chloride and then YI-value was measured by using a spectroscopy colorimeter, trade name "SE-2000", manufactured by NIPPON DENSHOKU INDUSTRIES CO., LTD.

6) N-Value:

A sample of aromatic polycarbonate dried at 130° C. for 5 hours was subjected to a measurement using a constant-load orifice-type flow tester, trade name "CFT-500D", manufactured by Shimadzu Corporation.

"Q160" was evaluated with the sample by a molten fluid volume per unit time measured under the conditions of 280° C. and 160 kg, and "Q10" was evaluated in the same manner by a molten fluid volume per unit time measured under the conditions of 280° C. and 10 kg. N-value was calculated by the following mathematical formula (1) using "Q160" which was a melting fluid volume per unit time measured under 280° C. and 160 kg load and "Q10" which was a melting fluid volume per unit time measured under 280° C. and 10 kg load. Q-value was the amount of flow of a melted resin (ml/sec).

$$N\text{-value}=(\log(Q160)-\log(Q10))/(\log 160 -\log 10) \tag{1}$$

Example 1

45.5 g (0.20 mol) of 2,2-bis(4-hydroxyphenyl)propane (hereinafter, "BPA"), 46.0 g (0.21 mol) of diphenyl carbonate, 0.15 g (0.49 mmol) of 1,1,1-trisphenolethane (hereinafter, "TPE") and 1 µmol/mol of sodium hydrogen carbonate as a catalyst, wherein "1 µmol/mol" means 1 µmol per mole of the total amount of BPA and TPE, were charged into a 300 cc four-neck flask equipped with a stirrer and a distiller and was heated at 180° C. in an nitrogen atmosphere with stirring for 30 minutes.

Subsequently, the degree of pressure reduction was adjusted to 20 kPaA (150 torr) and simultaneously the temperature was raised to 200° C. at a rate of 60° C./hr and the transesterification reaction was carried out for 40 minutes keeping the temperature as it is.

Then, the temperature was raised to 225° C. at a rate of 75° C./hr and the temperature was kept as it is for 10 minutes.

Subsequently, the temperature was raised to 260° C. at a rate of 65° C./hr and the pressure was reduced to 0.13 kPaA (1 torr) or less taking 1 hour, whereby 40 g of an aromatic polycarbonate prepolymer having the weight average molecular weight (Mw) of 33,200 was obtained.

30 g of the aromatic polycarbonate prepolymer thus obtained was charged into a 300 cc four-neck flask equipped with a stirrer and a distiller and was heated and melted under vacuum at 290° C.

Subsequently, 0.91 g (2.1 mmol) of 9,9-bis[4-(2-hydroxyethoxy)phenyl]fluorene was added therein, and the mixture was stirred and kneaded for 30 minutes at a jacket temperature of 290° C. under reduced pressure of 0.04 kPaA (0.3 torr).

Phenol distilled from the reaction system was condensed in a cooling tube to remove away from the reaction system. The weight average molecular weight (Mw) of the aromatic polycarbonate resin thus obtained was 61,000. The properties of the resulted polymer were shown in Table 1.

Example 2

45.5 g (0.20 mol) of 2,2-bis(4-hydroxyphenyl)propane, 46.0 g (0.21 mol) of diphenyl carbonate, 0.30 g (0.96 mmol) of 1,1,1-trisphenolethane (hereinafter, "TPE") and 1 µmol/mol of sodium hydrogen carbonate as a catalyst, wherein "1 µmol/mol" means 1 µmol per mole of the total amount of BPA and TPE, were charged into a 300 cc four-neck flask equipped with a stirrer and a distiller and was heated at 180° C. in an nitrogen atmosphere with stirring for 30 minutes.

Subsequently, the degree of pressure reduction was adjusted to 20 kPaA (150 torr) and simultaneously the temperature was raised to 200° C. at a rate of 60° C./hr and the transesterification reaction was carried out for 40 minutes keeping the temperature as it is.

Then, the temperature was raised to 225° C. at a rate of 75° C./hr and the temperature was kept as it is for 10 minutes.

Subsequently, the temperature was raised to 260° C. at a rate of 65° C./hr and the pressure was reduced to 0.13 kPaA (1 torr) or less taking 1 hour, whereby 40 g of an aromatic polycarbonate prepolymer having the weight average molecular weight (Mw) of 33,100 was obtained.

30 g of the aromatic polycarbonate prepolymer thus obtained was charged into a 300 cc four-neck flask equipped with a stirrer and a distiller and was heated and melted under vacuum at 290° C.

Subsequently, 0.90 g (2.0 mmol) of 9,9-bis [4-(2-hydroxyethoxy)phenyl]fluorene was added therein, and the mixture was stirred and kneaded for 30 minutes at a jacket temperature of 290° C. under reduced pressure of 0.04 kPaA (0.3 torr).

Phenol distilled from the reaction system was condensed in a cooling tube to remove away from the reaction system. The weight average molecular weight (Mw) of the aromatic polycarbonate resin thus obtained was 62,000. The properties of the resulted polymer were shown in Table 1.

Example 3

45.6 g (0.20 mol) of 2,2-bis(4-hydroxyphenyl)propane, 50.1 g (0.22 mol) of diphenyl carbonate, 0.31g (1.00 mmol) of 1,1,1-trisphenolethane and 1 µmol/mol of sodium hydrogen carbonate as a catalyst, wherein "1 µmol/mol" means 1 µmol per mole of the total amount of BPA and TPE, were charged into a 300 cc four-neck flask equipped with a stirrer and a distiller and was heated at 180° C. in an nitrogen atmosphere with stirring for 30 minutes.

Subsequently, the degree of pressure reduction was adjusted to 20 kPaA (150 torr) and simultaneously the temperature was raised to 200° C. at a rate of 60° C./hr and the transesterification reaction was carried out for 40 minutes keeping the temperature as it is.

Then, the temperature was raised to 225° C. at a rate of 75° C./hr and the temperature was kept as it is for 10 minutes.

Subsequently, the temperature was raised to 260° C. at a rate of 65° C./hr and the pressure was reduced to 0.13 kPaA (1 torr) or less taking 1 hour, whereby 40 g of an aromatic polycarbonate prepolymer having the weight average molecular weight (Mw) of 27,000 was obtained.

30 g of the aromatic polycarbonate prepolymer thus obtained was charged into a 300 cc four-neck flask equipped with a stirrer and a distiller and was heated and melted under vacuum at 290° C.

Subsequently, 1.21 g (2.8 mmol) of 9,9-bis [4-(2-hydroxyethoxy)phenyl]fluorene was added therein, and the mixture was stirred and kneaded for 30 minutes at a jacket temperature of 290° C. under reduced pressure of 0.04 kPaA (0.3 torr).

Phenol distilled from the reaction system was condensed in a cooling tube to remove away from the reaction system. The weight average molecular weight (Mw) of the aromatic polycarbonate resin thus obtained was 45,000. The properties of the resulted polymer were shown in Table 1.

Example 4

35.9 g (0.16 mol) of 2,2-bis(4-hydroxyphenyl)propane, 36.8 g (0.18 mol) of diphenyl carbonate, 0.42 g (1.37 mmol) of 1,1,1-trisphenolethane and 1 µmol/mol of sodium hydrogen carbonate as a catalyst, wherein "1 µmol/mol" means 1 µmol per mole of the total amount of BPA and TPE, were charged into a 300 cc four-neck flask equipped with a stirrer and a distiller and was heated at 180° C. in an nitrogen atmosphere with stirring for 30 minutes.

Subsequently, the degree of pressure reduction was adjusted to 20 kPaA (150 torr) and simultaneously the temperature was raised to 200° C. at a rate of 60° C./hr and the transesterification reaction was carried out for 40 minutes keeping the temperature as it is.

Then, the temperature was raised to 225° C. at a rate of 75° C./hr and the temperature was kept as it is for 10 minutes.

Subsequently, the temperature was raised to 260° C. at a rate of 65° C./hr and the pressure was reduced to 0.13 kPaA (1 torr) or less taking 1 hour, whereby 38 g of an aromatic polycarbonate prepolymer having the weight average molecular weight (Mw) of 32,100 was obtained.

30 g of the aromatic polycarbonate prepolymer thus obtained was charged into a 300 cc four-neck flask equipped with a stirrer and a distiller and was heated and melted under vacuum at 290° C.

Subsequently, 1.09 g (2.5 mmol) of 9,9-bis[4-(2-hydroxyethoxy)phenyl]fluorene was added therein, and the mixture was stirred and kneaded for 30 minutes at a jacket temperature of 290° C. under reduced pressure of 0.04 kPaA (0.3 torr).

Phenol distilled from the reaction system was condensed in a cooling tube to remove away from the reaction system. The weight average molecular weight (Mw) of the aromatic polycarbonate resin thus obtained was 65,000. The properties of the resulted polymer were shown in Table 1.

Comparative Example 1

45.6 g (0.20 mol) of 2,2-bis(4-hydroxyphenyl)propane, 46.1 g (0.22 mol) of diphenyl carbonate and 1 µmol/mol of sodium hydrogen carbonate as a catalyst, wherein "1 µmol/mol" means 1 µmol per mole of BPA, were charged into a 300 cc four-neck flask equipped with a stirrer and a distiller and was heated at 180° C. in an nitrogen atmosphere with stirring for 30 minutes.

Subsequently, the degree of pressure reduction was adjusted to 20 kPaA (150 torr) and simultaneously the temperature was raised to 200° C. at a rate of 60° C./hr and the transesterification reaction was carried out for 40 minutes keeping the temperature as it is.

Then, the temperature was raised to 225° C. at a rate of 75° C./hr and the temperature was kept as it is for 10 minutes.

Subsequently, the temperature was raised to 260° C. at a rate of 65° C./hr and the pressure was reduced to 0.13 kPaA (1 torr) or less taking 1 hour, whereby 39 g of an aromatic polycarbonate prepolymer having the weight average molecular weight (Mw) of 31,300 was obtained.

30 g of the aromatic polycarbonate prepolymer thus obtained was charged into a 300 cc four-neck flask equipped with a stirrer and a distiller and was heated and melted under vacuum at 290° C.

Subsequently, 1.00 g (2.3 mmol) of 9,9-bis[4-(2-hydroxyethoxy)phenyl]fluorene was added therein, and the mixture was stirred and kneaded for 30 minutes at a jacket temperature of 290° C. under reduced pressure of 0.04 kPaA (0.3 torr).

Phenol distilled from the reaction system was condensed in a cooling tube to remove away from the reaction system. The weight average molecular weight (Mw) of the aromatic polycarbonate resin thus obtained was 61,000. The properties of the resulted polymer were shown in Table 2.

Comparative Example 2

45.6 g (0.20 mol) of 2,2-bis(4-hydroxyphenyl)propane, 44.5 g (0.21 mol) of diphenyl carbonate and 1 μmol/mol of sodium hydrogen carbonate as a catalyst, wherein "1 μmol/mol" means 1 μmol per mole of BPA, were charged into a 300 cc four-neck flask equipped with a stirrer and a distiller and was heated at 180° C. in an nitrogen atmosphere with stirring for 30 minutes.

Subsequently, the degree of pressure reduction was adjusted to 20 kPaA (150 torr) and simultaneously the temperature was raised to 200° C. at a rate of 60° C./hr and the transesterification reaction was carried out for 40 minutes keeping the temperature as it is.

Then, the temperature was raised to 225° C. at a rate of 75° C./hr and the temperature was kept as it is for 10 minutes.

Subsequently, the temperature was raised to 290° C. at a rate of 65° C./hr and the pressure was reduced to 0.13 kPaA (1 torr) or less taking 1 hour. The polymerization reaction was carried out under stirring for 7 hours in total, whereby 36 g of aromatic polycarbonate having the weight average molecular weight (Mw) of 69,000 was obtained. The properties of the resulted polymer were shown in Table 2.

Comparative Example 3

45.6 g (0.20 mol) of 2,2-bis(4-hydroxyphenyl)propane, 44.4 g (0.21 mol) of diphenyl carbonate, 0.33 g (1.08 mmol) of 1,1,1-trisphenolethane and 1 μmol/mol of sodium hydrogen carbonate as a catalyst, wherein "1 μmol/mol" means 1 μmol per mole of the total amount of BPA and TPE, were charged into a 300 cc four-neck flask equipped with a stirrer and a distiller and was heated at 180° C. in an nitrogen atmosphere with stirring for 30 minutes.

Subsequently, the degree of pressure reduction was adjusted to 20 kPaA (150 torr) and simultaneously the temperature was raised to 200° C. at a rate of 60° C./hr and the transesterification reaction was carried out for 40 minutes keeping the temperature as it is.

Then, the temperature was raised to 225° C. at a rate of 75° C./hr and the temperature was kept as it is for 10 minutes.

Subsequently, the temperature was raised to 290° C. at a rate of 65° C./hr and the pressure was reduced to 0.13 kPaA (1 torr) or less taking 1 hour. The polymerization reaction was carried out under stirring for 7 hours in total, whereby 35 g of aromatic polycarbonate having the weight average molecular weight (Mw) of 95,000 was obtained. The properties of the resulted polymer were shown in Table 2.

Comparative Example 4

45.6 g (0.20 mol) of 2,2-bis(4-hydroxyphenyl)propane, 44.3 g (0.21 mol) of diphenyl carbonate, 0.49 g (1.58 mmol) of 1,1,1-trisphenolethane and 1 μmol/mol of sodium hydrogen carbonate as a catalyst, wherein "1 μmol/mol" means 1 μmol per mole of the total amount of BPA and TPE, were charged into a 300 cc four-neck flask equipped with a stirrer and a distiller and was heated at 180° C. in an nitrogen atmosphere with stirring for 30 minutes.

Subsequently, the degree of pressure reduction was adjusted to 20 kPaA (150 torr) and simultaneously the temperature was raised to 200° C. at a rate of 60° C./hr and the transesterification reaction was carried out for 40 minutes keeping the temperature as it is.

Then, the temperature was raised to 225° C. at a rate of 75° C./hr and the temperature was kept as it is for 10 minutes.

Subsequently, the temperature was raised to 290° C. at a rate of 65° C./hr and the pressure was reduced to 0.13 kPaA (1 torr) or less taking 1 hour. The polymerization reaction was carried out under stirring for 6 hours and 40 minutes in total, whereby 30 g of gelatinous aromatic polycarbonate having the weight average molecular weight (Mw) of 125,000 was obtained. The properties of the resulted polymer were shown in Table 2.

Reference Example 1

An aromatic polycarbonate polymer was produced by interfacial polymerization using 125.0 g (0.55 mol) of bisphenol A, 70.5 g (0.71 mol) of phosgene, 0.50 g (1.6 mmol) of 1,1,1-trisphenolethane and 4.15 g (27.7 mmol) of p-t-butylphenol. The properties of the resulted polymer were shown in Table 3.

Reference Example 2

An aromatic polycarbonate polymer was produced by interfacial polymerization using 125.0 g (0.55 mol) of bisphenol A, 70.5 g (0.71 mol) of phosgene, 0.84 g (2.7 mmol) of 1,1,1-trisphenolethane and 3.40 g (22.7 mmol) of p-t-butylphenol. The properties of the resulted polymer were shown in Table 3.

Reference Example 3

An aromatic polycarbonate polymer was produced by interfacial polymerization using 125.0 g (0.55 mol) of bisphenol A, 70.5 g (0.71 mol) of phosgene, 0.84 g (2.7 mmol) of 1,1,1-trisphenolethane and 4.38 g (29.2 mmol) of p-t-butylphenol. The properties of the resulted polymer were shown in Table 3.

Reference Example 4

An aromatic polycarbonate polymer was produced by interfacial polymerization using 125.0 g (0.55 mol) of bisphenol A, 70.5 g (0.71 mol) of phosgene, 1.20 g (3.9 mmol) of 1,1,1-trisphenolethane and 3.46 g (23.1 mmol) of p-t-butylphenol. The properties of the resulted polymer were shown in Table 3.

TABLE 1

|  |  | Example 1 | Example 2 | Example 3 | Example 4 | Comparative Ex. 1 |
|---|---|---|---|---|---|---|
| Production of Prepolymer | BPA (g) | 45.5 | 45.5 | 45.6 | 35.9 | 45.6 |
|  | DPC (g) | 46.0 | 46.0 | 50.1 | 36.8 | 46.1 |
|  | Branching Agent (g) | 0.15 | 0.30 | 0.31 | 0.42 | — |
|  | Additive Rate of Branching Agent (mol %) | 0.25 | 0.48 | 0.50 | 0.87 | 0.00 |
|  | Sodium Hydrogen Carbonate | 1 μmol/mol (*) | 1 μmol/mol (*) | 1 μmol/mol (*) | 1 μmol/mol (*) | 1 μmol/mol (*) |
|  | Molecular Weight of Prepolymer (Mw) | 33200 | 33100 | 27000 | 32100 | 31300 |
|  | Concentration of OH (ppm) | 450 | 460 | 250 | 270 | 160 |
| Linking and Highly Polymerizing Reaction | Prepolymer (g) | 30.0 | 30.0 | 30.0 | 30.0 | 30.0 |
|  | Total Amount of Terminal Groups (mol/ton) | 280 | 270 | 370 | 330 | 300 |
|  | BPEF (g) | 0.91 | 0.90 | 1.21 | 1.09 | 1.00 |
|  | (mmol) | 2.1 | 2.0 | 2.8 | 2.5 | 2.3 |
|  | Amount of BPEF Added Per Mole of Total Amount of Terminal Groups of Prepolymer (mol) | 0.25 | 0.25 | 0.25 | 0.25 | 0.25 |
|  | Molecular Weight of Polycarbonate Obtained (Mw) | 61000 | 62000 | 45000 | 65000 | 61000 |
|  | YI-value | 1.2 | 1.2 | 1.1 | 1.2 | 1.0 |
|  | N-value | 1.26 | 1.58 | 1.49 | 1.64 | 1.13 |

(*) Mole number per mole of the total amount of BPA and the branching agent
BPA: 2,2-bis(4-hydroxyphenyl)propane
DPC: Diphenyl arbonate
Branching Agent: 1,1,1-tris(4-hydroxyphenyl)ethane
BPEF: 9,9-bis[4-(2-hydroxyethoxy)phenyl]fluorene

TABLE 2

|  | Comparative Ex. 2 | Comparative Ex. 3 | Comparative Ex. 4 |
|---|---|---|---|
| BPA (g) | 45.6 | 45.6 | 45.6 |
| DPC (g) | 44.5 | 44.4 | 44.3 |
| Branching Agent (g) | — | 0.33 | 0.49 |
| Additive Rate of Branching Agent (mol %) | 0.00 | 0.54 | 0.79 |
| Sodium Hydrogen Carbonate (*) | 1 μmol/mol (*1) | 1 μmol/mol (*1) | 1 μmol/mol (*1) |
| Total Time of Reaction | 420 min | 480 min | 400 min |
| Molecular Weight of Polycarbonate Obtained (Mw) | 69000 | >95000 (*2) | >125000 (*3) |
| YI-value | 2.01 | 2.15 | 2.35 |
| N-value | 1.60 | 1.75 | 2.30 |

(*1) Mole number per mole of the total amount of BPA and the branching agent
(*2) Insoluble in part in chloroform which is a solvent of GPC
(*3) Insoluble in chloroform which is a solvent of GPC and gelled
BPA: 2,2-bis(4-hydroxyphenyl)propane
DPC: Diphenyl arbonate
Branching Agent: 1,1,1-tris(4-hydroxyphenyl)ethane

TABLE 3

|  | Reference Ex. 1 | Reference Ex. 2 | Reference Ex. 3 | Reference Ex. 4 |
|---|---|---|---|---|
| BPA (g) | 125.0 | 125.0 | 125.0 | 125.0 |
| Phosgene (g) | 70.5 | 70.5 | 70.5 | 70.5 |
| Branching Agent (g) | 0.50 | 0.84 | 0.84 | 1.20 |
| Additive Rate of Branching Agent (mol %) | 0.30 | 0.50 | 0.50 | 0.71 |
| PTBT (g) | 4.15 | 3.4 | 4.38 | 3.46 |
| Molecular Weight of Polycarbonate Obtained (Mw) | 60000 | 74000 | 52000 | 74000 |
| YI-value | 0.80 | 0.80 | 0.80 | 0.80 |
| N-value | 1.35 | 1.46 | 1.53 | 1.63 |

BPA: 2,2-bis(4-hydroxyphenyl)propane
Branching Agent: 1,1,1-tris(4-hydroxyphenyl)ethane
PTBT: p-t-butylphenol FIG. 1 shows a relationship between the amount of the branching agent (or the additive rate of the branching agent; mol %) and N-value of the above-mentioned Examples 1-4, Comparative Examples 1-4 and Reference Examples 1-4.

As shown in FIG. 1, N-value was increased in proportion to the increase of the additive rate of TPE in Examples 1-4.

$K_1$ and $K_2$ in the above-mentioned mathematical formula (II) representing the relationship between N-value and the amount of the branching agent used (A) was determined by the regression curve and segment of the additive rate of the branching agent (TPE) and N-value shown in FIG. 1 in consideration of deviation of measured values. In this case, $K_1$ was approximately 0.6 and $K_2$ was approximately 1.2.

In the case of branched aromatic polycarbonate resins obtained in Reference Examples 1-2 by interfacial polymerization, the relation between N-value and the additive rate of TPE was almost similar to the case of Examples 1-3.

In the case of Comparative Examples 2-4 wherein melt polymerization was carried out in the same manner as in Examples except for using no aliphatic diol compounds, since there is no linear relationship between the additive rate of the branching agent and N-value, it was difficult to adjust the degree of branching by controlling the amount of the branching agent used.

As is clear from the above results, the present invention enables to produce a branched aromatic polycarbonate resin having desired N-value by melt polymerization without using interfacial polymerization which has problems in safety in manufacturing process and environmental concerns, which could not be achieved by conventional melt polymerization.

Example 5

42.0 g of 2,2-bis(4-hydroxyphenyl)propane, 43.0 g of diphenyl carbonate, 0.15 g of α,α,α'-tris(4-hydroxyphenyl)-1-ethyl-4-isopropylbenzene as a branching agent and 2 μmol/mol of disodium phenylphosphate ($PhNa_2PO_4$) were charged into a 300 cc four-neck flask equipped with a stirrer and a distiller and was heated at 180° C. in an nitrogen atmosphere with stirring for 30 minutes.

Subsequently, the degree of pressure reduction was adjusted to 20 kPaA (150 torr) and simultaneously the temperature was raised to 200° C. at a rate of 60° C./hr and the transesterification reaction was carried out for 40 minutes keeping the temperature as it is.

Then, the temperature was raised to 225° C. at a rate of 75° C./hr and the temperature was kept as it is for 10 minutes.

Subsequently, the temperature was raised to 260° C. at a rate of 65° C./hr and, the pressure was reduced to 0.13 kPaA (1 torr) or less taking 1 hour, whereby 40 g of an aromatic polycarbonate prepolymer having the weight average molecular weight (Mw) of 30,000 was obtained.

30 g of the aromatic polycarbonate prepolymer thus obtained was charged into a 300 cc four-neck flask equipped with a stirrer and a distiller and was heated and melted under vacuum at 290° C.

Subsequently, 0.47 g (1.5 mmol) of 2,2'-bis[(2-hydroxyethoxy)phenyl]propane (BPA-2EO) was added therein, and the mixture was stirred and kneaded for 30 minutes at a jacket temperature of 290° C. under reduced pressure of 0.04 kPaA (0.3 torr).

Phenol distilled from the reaction system was condensed in a cooling tube to remove away from the reaction system. The weight average molecular weight (Mw) of the aromatic polycarbonate resin thus obtained was 58,000. The properties of the resulted polymer were shown in Table 4.

Examples 6-7

The experiments were carried out in the same manner as in Example 5 except for changing the amount of the branching agent used and the amount of aliphatic diol compound used as shown in Table 4. The results were shown in Table 4.

Comparative Example 5

The experiment was carried out in the same manner as in Example 5 except for using no branching agents, and an aromatic polycarbonate prepolymer having the weight average molecular weight (Mw) of 30,000 was obtained.

30 g of the aromatic polycarbonate prepolymer thus obtained was charged into a 300 cc four-neck flask equipped with a stirrer and a distiller and was heated and melted under vacuum at 290° C. in the same manner as in Example 5.

Subsequently, 0.47 g (1.5 mmol) of 2,2'-bis[(2-hydroxyethoxy)phenyl]propane (BPA-2EO) was added therein, and the mixture was stirred and kneaded for 30 minutes at a jacket temperature of 290° C. under reduced pressure of 0.04 kPaA (0.3 torr).

Phenol distilled from the reaction system was condensed in a cooling tube to remove away from the reaction system. The weight average molecular weight (Mw) of the aromatic polycarbonate resin thus obtained was 59,000. The properties of the resulted polymer were shown in Table 4.

TABLE 4

| | | Example 5 | Example 6 | Example 7 | Comparative Ex. 5 |
|---|---|---|---|---|---|
| Production of Prepolymer | BPA (g) | 42.0 | 42.0 | 42.0 | 42.0 |
| | DPC (g) | 43.0 | 43.0 | 43.0 | 43.0 |
| | Branching Agent (g) | 0.15 | 0.30 | 0.60 | — |
| | Additive Rate of Branching Agent (mol %) | 0.19 | 0.38 | 0.76 | 0.00 |
| | Disodium Phenylphosphate ($PhNa_2PO_4$) | 2 μmol/mol (*) | 2 μmol/mol (*) | 2 μmol/mol (*) | 2 μmol/mol (*) |
| | Molecular Weight of Prepolymer (Mw) | 30000 | 28000 | 31000 | 30000 |
| | Concentration of OH (ppm) | 180 | 190 | 200 | 200 |
| Linking and Highly Polymerizing Reaction | Prepolymer (g) | 30.0 | 30.0 | 30.0 | 30.0 |
| | Total Amount of Terminal Groups (mol/ton) | 200 | 200 | 200 | 190 |
| | BPA-2EO (g) | 0.47 | 0.47 | 0.46 | 0.46 |
| | (mmol) | 1.5 | 1.5 | 1.5 | 1.4 |
| | Amount of BPA-2EO Added Per Mole of Total Amount of Terminal Groups of Prepolymer (mol) | 0.25 | 0.25 | 0.25 | 0.25 |
| | Molecular Weight of Polycarbonate Obtained (Mw) | 58000 | 60000 | 59000 | 59000 |
| | YI-value | 1.0 | 1.1 | 1.2 | 1.1 |
| | N-value | 1.27 | 1.43 | 1.59 | 1.18 |

(*) Mole number per mole of the total amount of BPA and the branching agent
BPA: 2,2-bis(4-hydroxyphenyl)propane
DPC: Diphenyl arbonate
Branching Agent: α,α,α'-tris(4-hydroxyphenyl)-1-ethyl-4-isopropylbenzene
BPA-2EO: 2,2'-bis[(2-hydroxyethoxy)phenyl]propane FIG. 2 shows a relationship between the amount of the branching agent (or the additive rate of the branching agent; mol %) and N-value of the above-mentioned Examples 5-7 and Comparative Example 5. As a reference, the results of Comparative Examples 2-4 using the conventional melt polymerization and Reference Examples 1-4 using interfacial polymerization were also shown therein together.

As shown in FIG. 2, N-value was increased in proportion to the increase of the additive rate of the branching agent in Examples 5-7.

$K_1$ and $K_2$ in the above-mentioned mathematical formula (II) representing the relationship between N-value and the amount of the branching agent used (A) was determined by the regression curve and segment of the additive rate of the branching agent and N-value shown in FIG. 2 in consideration of deviation of measured values. In this case, $K_1$ was approximately 0.6 and $K_2$ was approximately 1.2.

In the case of branched aromatic polycarbonate resins obtained in Reference Examples 1-4 by interfacial polymerization, the relation between N-value and the additive rate of the branching agent was almost similar to the case of Examples 5-7.

Example 8

45.0 g of 2,2-bis(4-hydroxyphenyl)propane, 46.5 g of diphenyl carbonate, 0.08 g of trimethylolpropane as a branching agent and 0.5 μmol/mol of cesium carbonate ($Cs_2CO_3$) were charged into a 300 cc four-neck flask equipped with a stirrer and a distiller and was heated at 180° C. in an nitrogen atmosphere with stirring for 30 minutes.

Subsequently, the degree of pressure reduction was adjusted to 20 kPaA (150 torr) and simultaneously the temperature was raised to 200° C. at a rate of 60° C./hr and the transesterification reaction was carried out for 40 minutes keeping the temperature as it is.

Then, the temperature was raised to 225° C. at a rate of 75° C./hr and the temperature was kept as it is for 10 minutes.

Subsequently, the temperature was raised to 260° C. at a rate of 65° C./hr and, the pressure was reduced to 0.13 kPaA (1 torr) or less taking 1 hour, whereby 40 g of an aromatic polycarbonate prepolymer having the weight average molecular weight (Mw) of 30,000 was obtained.

30 g of the aromatic polycarbonate prepolymer thus obtained was charged into a 300 cc four-neck flask equipped with a stirrer and a distiller and was heated and melted under vacuum at 290° C.

Subsequently, 0.19 g (1.3 mmol) of 1,4-cyclohexanedimethanol (CHDM) was added therein, and the mixture was stirred and kneaded for 30 minutes at a jacket temperature of 290° C. under reduced pressure of 0.04 kPaA (0.3 torr).

Phenol distilled from the reaction system was condensed in a cooling tube to remove away from the reaction system. The weight average molecular weight (Mw) of the aromatic polycarbonate resin thus obtained was 57,000. The properties of the resulted polymer were shown in Table 5.

Examples 9-10

The experiments were carried out in the same manner as in Example 8 except for changing the amount of the branching agent used and the amount of aliphatic diol compound used as shown in Table 5. The results were shown in Table 5.

Comparative Example 6

The experiment was carried out in the same manner as in Example 8 except for using no branching agents, and an aromatic polycarbonate prepolymer having the weight average molecular weight (Mw) of 31,000 was obtained.

30 g of the aromatic polycarbonate prepolymer thus obtained was charged into a 300 cc four-neck flask equipped with a stirrer and a distiller and was heated and melted under vacuum at 290° C. in the same manner as in Example 8.

Subsequently, 0.20 g (1.4 mmol) of 1,4-cyclohexanedimethanol was added therein, and the mixture was stirred and kneaded for 30 minutes at a jacket temperature of 290° C. under reduced pressure of 0.04 kPaA (0.3 torr).

Phenol distilled from the reaction system was condensed in a cooling tube to remove away from the reaction system. The weight average molecular weight (Mw) of the aromatic polycarbonate resin thus obtained was 58,000. The properties of the resulted polymer were shown in Table 5.

TABLE 5

| | | Example 8 | Example 9 | Example 10 | Comparative Ex. 6 |
|---|---|---|---|---|---|
| Production of Prepolymer | BPA (g) | 45.0 | 45.0 | 45.0 | 45.0 |
| | DPC (g) | 46.5 | 46.5 | 46.5 | 46.5 |
| | Branching Agent (g) | 0.08 | 0.15 | 0.20 | — |
| | Additive Rate of Branching Agent (mol %) | 0.30 | 0.56 | 0.75 | 0.00 |
| | Cesium Carbonate ($Cs_2CO_3$) | 0.5 μmol/mol (*) | 0.5 μmol/mol (*) | 0.5 μmol/mol (*) | 0.5 μmol/mol (*) |
| | Molecular Weight of Prepolymer (Mw) | 32000 | 31000 | 32000 | 31000 |
| | Concentration of OH (ppm) | 70 | 80 | 90 | 60 |
| Linking and Highly Polymerizing Reaction | Prepolymer (g) | 30.0 | 30.0 | 30.0 | 30.0 |
| | Total Amount of Terminal Groups (mol/ton) | 180 | 180 | 180 | 180 |
| | CHDM (g) | 0.19 | 0.20 | 0.20 | 0.20 |
| | (mmol) | 1.3 | 1.4 | 1.4 | 1.4 |
| | Amount of CHDM Added Per Mole of Total Amount of Terminal Groups of Prepolymer (mol) | 0.25 | 0.25 | 0.25 | 0.25 |
| | Molecular Weight of Polycarbonate Obtained (Mw) | 57000 | 59000 | 60000 | 58000 |
| | YI-value | 1.1 | 1.2 | 1.2 | 1.1 |
| | N-value | 1.30 | 1.52 | 1.71 | 1.18 |

(*) Mole number per mole of the total amount of BPA and the branching agent
BPA: 2,2-bis(4-hydroxyphenyl)propane
DPC: Diphenyl arbonate
Branching Agent: trimethylolpropane
CHDM: 1,4-cyclohexanedimethanol FIG. 3 shows a relationship between the amount of the branching agent and N-value of the above-mentioned Examples 8-10 and Comparative Example 6. As a reference, the results of Comparative Examples 2-4 using the conventional melt polymerization and Reference Examples 1-4 using interfacial polymerization were also shown therein together.

As shown in FIG. 3, N-value was increased in proportion to the increase of the additive rate of the branching agent in Examples 8-10.

$K_1$ and $K_2$ in the above-mentioned mathematical formula (II) representing the relationship between N-value and the amount of the branching agent used (A) was determined by the regression curve and segment of the additive rate of the branching agent and N-value shown in FIG. 3 in consideration of deviation of measured values. In this case, $K_1$ was approximately 0.7 and $K_2$ was approximately 1.1.

In the case of branched aromatic polycarbonate resins obtained in Reference Examples 1-4 by interfacial polymerization, the relation between N-value and the additive rate of the branching agent was almost similar to the case of Examples 8-10.

Example 11

41.5 g of 2,2-bis(4-hydroxyphenyl)propane, 43.0 g of diphenyl carbonate, 0.10 g of 1,1,1-tris(4-hydroxyphenyl)ethane (TPA) as a branching agent and 1 μmol/mol of sodium tetraphenylborate ($Ph_4BNa$) were charged into a 300 cc four-neck flask equipped with a stirrer and a distiller and was heated at 180° C. in an nitrogen atmosphere with stirring for 30 minutes.

Subsequently, the degree of pressure reduction was adjusted to 20 kPaA (150 torr) and simultaneously the temperature was raised to 200° C. at a rate of 60° C./hr and the transesterification reaction was carried out for 40 minutes keeping the temperature as it is.

Then, the temperature was raised to 225° C. at a rate of 75° C./hr and the temperature was kept as it is for 10 minutes.

Subsequently, the temperature was raised to 260° C. at a rate of 65° C./hr and, the pressure was reduced to 0.13 kPaA (1 torr) or less taking 1 hour, whereby 40 g of an aromatic polycarbonate prepolymer having the weight average molecular weight (Mw) of 28,000 was obtained.

30 g of the aromatic polycarbonate prepolymer thus obtained was charged into a 300 cc four-neck flask equipped with a stirrer and a distiller and was heated and melted under vacuum at 290° C.

Subsequently, 0.30 g (1.5 mmol) of decalindimethanol (DDM) was added therein, and the mixture was stirred and kneaded for 30 minutes at a jacket temperature of 290° C. under reduced pressure of 0.04 kPaA (0.3 torr).

Phenol distilled from the reaction system was condensed in a cooling tube to remove away from the reaction system. The weight average molecular weight (Mw) of the aromatic polycarbonate resin thus obtained was 59,000. The properties of the resulted polymer were shown in Table 6.

Examples 12-13

The experiments were carried out in the same manner as in Example 11 except for changing the amount of the branching agent used and the amount of aliphatic diol compound used as shown in Table 6. The results were shown in Table 6.

Comparative Example 7

The experiment was carried out in the same manner as in Example 11 except for using no branching agents, and an aromatic polycarbonate prepolymer having the weight average molecular weight (Mw) of 28,000 was obtained.

30 g of the aromatic polycarbonate prepolymer thus obtained was charged into a 300 cc four-neck flask equipped with a stirrer and a distiller and was heated and melted under vacuum at 290° C. in the same manner as in Example 11.

Subsequently, 0.30 g (1.5 mmol) of decalindimethanol (DDM) was added therein, and the mixture was stirred and kneaded for 30 minutes at a jacket temperature of 290° C. under reduced pressure of 0.04 kPaA (0.3 torr).

Phenol distilled from the reaction system was condensed in a cooling tube to remove away from the reaction system. The weight average molecular weight (Mw) of the aromatic polycarbonate resin thus obtained was 57,000. The properties of the resulted polymer were shown in Table 6.

TABLE 6

|  |  | Example 11 | Example 12 | Example 13 | Comparative Ex. 7 |
|---|---|---|---|---|---|
| Production of Prepolymer | BPA (g) | 41.5 | 41.5 | 41.5 | 41.5 |
|  | DPC (g) | 43.0 | 43.0 | 43.0 | 43.0 |
|  | Branching Agent (g) | 0.10 | 0.20 | 0.40 | — |
|  | Additive Rate of Branching Agent (mol %) | 0.18 | 0.36 | 0.71 | 0.00 |
|  | Sodium Tetraphenylborate ($Ph_4BNa$) | 1 μmol/mol (*) | 1 μmol/mol (*) | 1 μmol/mol (*) | 1 μmol/mol (*) |
|  | Molecular Weight of Prepolymer (Mw) | 28000 | 27000 | 29000 | 28000 |
|  | Concentration of OH (ppm) | 210 | 220 | 230 | 220 |
| Linking and Highly Polymerizing Reaction | Prepolymer (g) | 30.0 | 30.0 | 30.0 | 30.0 |
|  | Total Amount of Terminal Groups (mol/ton) | 200 | 200 | 200 | 200 |
|  | DDM (g) | 0.30 | 0.30 | 0.30 | 0.30 |
|  | (mmol) | 1.5 | 1.5 | 1.5 | 1.5 |
|  | Amount of DDM Added Per Mole of Total Amount of Terminal Groups of Prepolymer (mol) | 0.25 | 0.25 | 0.25 | 0.25 |
|  | Molecular Weight of Polycarbonate Obtained (Mw) | 59000 | 60000 | 58000 | 57000 |
|  | YI-value | 1.2 | 1.2 | 1.1 | 1.1 |
|  | N-value | 1.30 | 1.45 | 1.60 | 1.19 |

(*) Mole number per mole of the total amount of BPA and the branching agent
BPA: 2,2-bis(4-hydroxyphenyl)propane
DPC: Diphenyl arbonate
Branching Agent: 1,1,1-tris(4-hydroxyphenyl)ethane
DDM: decalindimethanol FIG. 4 shows a relationship between the amount of the branching agent and N-value of the above-mentioned Examples 11-13 and Comparative Example 7. As a reference, the results of Comparative Examples 2-4 using the conventional melt polymerization and Reference Examples 1-4 using interfacial polymerization were also shown therein together.

As shown in FIG. 4, N-value was increased in proportion to the increase of the additive rate of the branching agent in Examples 11-13.

$K_1$ and $K_2$ in the above-mentioned mathematical formula (II) representing the relationship between N-value and the amount of the branching agent used (A) was determined by the regression curve and segment of the additive rate of the branching agent and N-value shown in FIG. 4 in consideration of deviation of measured values. In this case, $K_1$ was approximately 0.6 and $K_2$ was approximately 1.2.

In the case of branched aromatic polycarbonate resins obtained in Reference Examples 1-4 by interfacial polymerization, the relation between N-value and the additive rate of the branching agent was almost similar to the case of Examples 11-13.

INDUSTRIAL APPLICABILITY

According to the process of the present invention, a branched high-molecular-weight aromatic polycarbonate resin which has a desired amount of branched structure (N-value) and is excellent in quality and color tone can be manufactured by using a conventional branching agent under moderate conditions and short processing time.

The branched high-molecular-weight aromatic polycarbonate resin thus obtained is a polycarbonate resin having a desirable melt flow property wherein N-value thereof is controlled within an appropriate range, and therefore, it is especially suitable for the use for large-volume hollow-molded articles, large-scale extrusion molded articles, blow-molded articles and the like.

The invention claimed is:

1. A process for manufacturing a branched aromatic polycarbonate resin having a desired degree of branching which comprises a process wherein an aromatic polycarbonate prepolymer having a branched structure introduced by using a predetermined amount of a branching agent is subjected to linking and a highly-polymerizing reaction by melt polymerization under reduced pressure with an aliphatic diol compound having aliphatic hydrocarbon groups bonding to terminal OH groups.

2. The process for manufacturing a branched aromatic polycarbonate resin according to claim 1, wherein the degree of branching of said branched aromatic polycarbonate resin is controlled within a desired range by adjusting the amount of said branching agent used (A; mol %) on the basis of a correlation between the amount of said branching agent used (A) and said degree of branching which is a structural viscosity index, "N-value", represented by the following mathematical formula (I):

$$N\text{-value} = (\log(Q160) - \log(Q10))/(\log 160 - \log 10) \quad (I)$$

wherein "Q160" represents a melting fluid volume per unit time (ml/sec) measured under the conditions of 280° C. and 160 kg load and "Q10" represents a melting fluid volume per unit time (ml/sec) measured under the conditions of 280° C. and 10 kg load.

3. The process for manufacturing a branched aromatic polycarbonate resin according to claim 2, wherein said correlation between the amount of the branching agent used (A) and the degree of branching (N-value) satisfies the following mathematical formula (II):

$$N\text{-value} = K_1 A + K_2 \quad (II)$$

wherein $K_1$ represents a constant number from 0.1 to 2.0 and $K_2$ represents a constant number from 1.05 to 1.5.

4. The process for manufacturing a branched aromatic polycarbonate resin according to claim 1, wherein said amount of the branching agent used (A) is 0.01 to 1 mol % based upon the total amount (total mole number) of carbonate constituting units of said aromatic polycarbonate prepolymer.

5. The process for manufacturing a branched aromatic polycarbonate resin according to claim 1, wherein said degree of branching ("N-value") is 1.1 to 2.2.

6. The process for manufacturing a branched aromatic polycarbonate resin according to claim 1, wherein said aliphatic diol compound is represented by the following general formula (I):

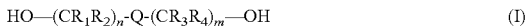

$$HO—(CR_1R_2)_n-Q-(CR_3R_4)_m—OH \quad (I)$$

wherein "Q" represents a hydrocarbon group having at least 3 carbon atoms which may contain atoms of a different kind; $R_1$-$R_4$ each independently represent a group selected from the group consisting of a hydrogen atom, an aliphatic hydrocarbon group having 1-30 carbon atoms and an aromatic hydrocarbon group having 1-30 carbon atoms, with the proviso that at least one of $R_1$ and $R_2$ and at least one of $R_3$ and $R_4$ are each independently selected from the group consisting of a hydrogen atom and said aliphatic hydrocarbon group; "n" and "m" each independently represent an integer of 0-10, or "n" and "m" each independently represent an integer of 1-10 in the case that "Q" does not contain aliphatic hydrocarbon groups bonding to terminal OH groups.

7. The process for manufacturing a branched aromatic polycarbonate resin according to claim 1, wherein said aliphatic diol compound has a boiling point of 240° C. or higher.

8. The process for manufacturing a branched aromatic polycarbonate resin according to claim 1, wherein the concentration of terminal hydroxy groups of said aromatic polycarbonate prepolymer is 1,500 ppm or less.

9. The process for manufacturing a branched aromatic polycarbonate resin according to claim 1, wherein the weight average molecular weight (Mw) of said branched aromatic polycarbonate resin is higher by 5,000 or more than the weight average molecular weight (Mw) of said aromatic polycarbonate prepolymer.

10. The process for manufacturing a branched aromatic polycarbonate resin according to claim 1, wherein said aliphatic diol compound is used in an amount of 0.01 to 1.0 mole per mole of the total amount of the terminal groups of said aromatic polycarbonate prepolymer.

11. The process for manufacturing a branched aromatic polycarbonate resin according to claim 1, wherein said linking and highly-polymerizing reaction is carried out at a temperature of 240° C.-320° C. under reduced pressure.

12. The process for manufacturing a branched aromatic polycarbonate resin according to claim 1, wherein said linking and highly-polymerizing reaction is carried under reduced pressure of 13 kPa (100 torr) to 0.01 kPa (0.01 torr).

13. The process for manufacturing a branched aromatic polycarbonate resin according to claim 1, wherein the weight average molecular weight (Mw) of said aromatic polycarbonate prepolymer is 5,000 to 60,000.

14. A branched aromatic polycarbonate resin which is manufactured by the process according to claim 1.

15. The branched aromatic polycarbonate resin according to claim 14, wherein the weight average molecular weight (Mw) thereof is 30,000 to 100,000.

* * * * *